(12) United States Patent
Rollinson

(10) Patent No.: US 12,522,307 B2
(45) Date of Patent: Jan. 13, 2026

(54) VEHICLE

(71) Applicant: RI&D PTY LTD, Jeeralang Junction (AU)

(72) Inventor: Damien Rollinson, Jeeralang Junction (AU)

( * ) Notice: Subject to any disclaimer, the term of this patent is extended or adjusted under 35 U.S.C. 154(b) by 572 days.

(21) Appl. No.: 17/922,813

(22) PCT Filed: Apr. 22, 2021

(86) PCT No.: PCT/AU2021/050360
§ 371 (c)(1),
(2) Date: Nov. 2, 2022

(87) PCT Pub. No.: WO2021/222969
PCT Pub. Date: Nov. 11, 2021

(65) Prior Publication Data
US 2023/0174177 A1 Jun. 8, 2023

(30) Foreign Application Priority Data
May 4, 2020 (AU) ................. 2020202949

(51) Int. Cl.
*B62D 57/032* (2006.01)
*B25J 9/00* (2006.01)
*B25J 13/04* (2006.01)

(52) U.S. Cl.
CPC .......... *B62D 57/032* (2013.01); *B25J 9/0006* (2013.01); *B25J 13/04* (2013.01)

(58) Field of Classification Search
CPC ........ B62D 57/032; A61H 3/00; B62J 9/0006; B62J 13/04; B62J 13/08; G05D 3/12; B60W 30/1819
See application file for complete search history.

(56) References Cited

U.S. PATENT DOCUMENTS 5,016,869 A * 5/1991 Dick ................. A63B 25/08
482/77
9,561,829 B1 2/2017 Urata et al.
(Continued)

FOREIGN PATENT DOCUMENTS

CA 2885228 A1 * 7/2014 ............. A61F 2/66
CN 101058322 A 10/2007
(Continued)

OTHER PUBLICATIONS

Fujimoto et al. JP 2008 253539 Machine English Translation, ip.com (Year: 2008).*
(Continued)

*Primary Examiner* — Karen Beck
(74) *Attorney, Agent, or Firm* — Larson & Larson; Frank Liebenow

(57) ABSTRACT

A bipedal vehicle 1 comprising two extendible output legs $5_L$, $5_R$ (to support the vehicle), two foot holds $59_L$, $59_R$ (to accept input movement from an operator) and a control system 253 comprising powered actuators to move the output legs in relation to the input movement to produce output movement.

19 Claims, 14 Drawing Sheets

(56) References Cited

U.S. PATENT DOCUMENTS

| | | | |
|---|---|---|---|
| 11,738,452 B1* | 8/2023 | Smith | B25J 9/0006 318/568.12 |
| 2010/0256537 A1 | 10/2010 | Menga | |
| 2017/0252254 A1 | 9/2017 | Velazquez Nino | |
| 2018/0133905 A1* | 5/2018 | Smith | F16D 25/14 |
| 2019/0021933 A1* | 1/2019 | Murakami | A61H 1/0244 |
| 2020/0022823 A1 | 1/2020 | Herr et al. | |
| 2020/0108510 A1* | 4/2020 | Tippett | B25J 9/0006 |

FOREIGN PATENT DOCUMENTS

| | | | | |
|---|---|---|---|---|
| CN | 107128394 A | * | 9/2017 | B62D 57/032 |
| CN | 209059884 U | * | 7/2019 | A61H 3/00 |
| EP | 0850729 A2 | | 1/1998 | |
| JP | 2007319940 A | | 12/2007 | |
| JP | 2008253539 A | * | 10/2008 | |
| JP | 4989278 B2 | | 8/2012 | |
| WO | WO-2013084789 A1 | * | 6/2013 | B62D 57/032 |
| WO | 2018209442 A1 | | 11/2018 | |
| WO | WO-2025049602 A1 | * | 3/2025 | |

OTHER PUBLICATIONS

Tippett WO-2018209442-A1 (Year: 2018).*

Anonymous: "Amplified Mobility Platform : Avatar Wiki : Fandom", Feb. 19, 2018 (Feb. 19, 2018), XP093154952, Retrieved from the Internet.

Grishin A A: "Dynamic Walking of a Vehicle With Two Telescopic Legs Controlled by Two Drives", The International Journal of Robotics Research,, vol. 13, No. 2, I Apr. 1994 (Apr. 1, 1994).

Technabob (Strauss, P. "1960s Walking Truck: The First AT-AT?" Technabob.com (May 26, 2011) <https://technabob.com/blog/2011/05/26/ge-walking-truck/> (retrieved Apr. 17, 2020)).

Boston Dynamics' Big DogTM, have been developed. "The Evolution of Boston Dynamics' Robot Dogs" (YouTube, uploaded by Vocativ (Nov. 18, 2017) <https://www.youtube.com/watch?v=RYzn_gmFs5w>—can be watched by searching for "The Evolution of Boston Dynamics' Robot Dogs".

* cited by examiner

VEHICLE

CROSS REFERENCE TO RELATED APPLICATIONS

This application is a national entry of International Application No. WO 2021/222969, filed on Apr. 22, 2021, which claims priority to and benefits of Australian Patent Application No. 2020202949 filed May 4, 2020, both of which are incorporated herein by reference.

FIELD OF THE INVENTION

The invention relates to vehicles.

BACKGROUND OF THE INVENTION

The vast majority of land vehicles are either wheeled or tracked. Tracked vehicles are often better adapted to rougher terrain but nonetheless have their limitations.

Technabob (Strauss, P. "1960s Walking Truck: The First AT-AT?" Technabob.com (26 May 2011) <https://technabob.com/blog/2011/05/26/ge-walking-truck/>(retrieved 17 Apr. 2020)) discloses a four-legged "walking truck" and suggests that the truck was developed in the late 1960's as an experimental vehicle for rough terrain. The embedded video shows the operator's cabin rocking as the machine takes a few awkward steps during which the vehicle is tethered to an overhead gantry. The video explains that "the strain of thinking about which leg to move next exhausted the operator in about 15 minutes".

More recently, unmanned quadrupeds, such as Boston Dynamics' Big Dog™, have been developed. "The Evolution of Boston Dynamics' Robot Dogs" (YouTube, uploaded by Vocativ (18 November 2017) <https://www.youtube.com/watch?v=RYzn_gmFs5w>(retrieved 17 Apr. 2020)) shows autonomous quadrupeds that are deft of foot.

With the foregoing in mind, the present invention aims to provide improvements in and for vehicles, or at least to provide alternatives in and for vehicles.

It is not admitted that any of the information in this patent specification is common general knowledge, or that the person skilled in the art could be reasonably expected to ascertain or understand it, regard it as relevant or combine it in any way before the priority date.

SUMMARY OF THE INVENTION

One aspect of the invention provides a bipedal vehicle comprising
- two extendible output legs to support the vehicle;
- two foot holds to accept input movement from an operator; and
- a control system comprising powered actuators to move the output legs in relation to the input movement to produce output movement.

Preferably, the control system comprises a respective knee sub-system for each respective output leg of the two output legs. The output legs may have pivotal knee joints controlled by the knee sub-systems. Alternatively, the output legs may comprise other means of extension controlled by the knee sub-systems. By way of example, the output legs might be telescopically extendable.

Each respective knee sub-system may comprise a respective position-feedback Flexible Pulling System (FPS) routed to be tensioned by a respective knee input movement and relaxed by a respective knee output movement corresponding to the respective knee input movement. A respective position-feedback FPS relative-length being a respective position-feedback FPS length relative to a respective position-feedback FPS path length. Preferably, the respective knee output movement is extension of the respective output leg.

Preferably, each respective knee sub-system comprises a respective knee actuator arranged to effect the respective knee output movement and controlled in response to a respective tension in the respective position-feedback FPS. Preferably, each respective knee actuator comprises a respective output fluid actuator. Optionally, each respective knee sub-system comprises a respective force-feedback fluid actuator, e.g. plumbed to operate in parallel to the respective knee output fluid actuator.

Optionally, each respective knee sub-system comprises a respective actuator-drive comprising a respective drive input movable to vary a respective drive to the respective knee actuator. Each respective knee sub-system may comprise a respective bias against which the respective drive input is moved by the respective tension. Each respective knee sub-system preferably comprises a respective preload adjustor for adjusting a respective preload on the respective bias.

The vehicle may comprise a preload user-interface by which the operator, whilst operatively engaged with the foot holds, can provide a single user-input to simultaneously adjust each respective preload adjustor.

Optionally, each respective drive input is movable to reconfigure the respective actuator-drive to each of
- a respective advance configuration for advancing the respective knee actuator;
- a respective neutral configuration for stopping the respective knee actuator; and
- a respective reversal configuration for reversing the respective knee actuator.

Preferably, the respective actuator drive is configured to provide a respective continuously-variable drive; the respective advance configuration and respective reversal configuration may each be a range of driving amounts in respective directions each side of a respective neutral point. Preferably, the amount of drive is related to the amount of drive input movement. The actuator drive might take the form of a proportional spool valve, although non-linear input/output relationships across the actuator drive are possible.

Each respective knee actuator may be a respective fluid actuator, e.g. a respective ram. Each respective actuator-drive may be a respective valve system.

Preferably, each respective knee sub-system comprises a respective force-feedback system to vary the respective bias in relation to a respective output load. Each respective force-feedback system may comprise
- a respective anchor against which the respective bias acts;
- a respective resilient portion arranged to be resiliently deformed by the respective output load by a respective amount-of-deformation; and
- a respective force-feedback mechanical transmission by which the respective amount-of-deformation moves the respective anchor a respective corresponding anchor-movement-amount.

Optionally, each respective force-feedback mechanical transmission comprises a respective force-feedback FPS, in which case each respective force-feedback system may be configured to lengthen, by a respective lengthening-amount related to the respective amount-of-deformation, the respective position-feedback FPS relative length.

Preferably, each respective knee sub-system comprises a respective force-feedback system to vary the respective bias in relation to a respective output load. Optionally, each respective force-feedback system comprises a respective anchor, against which the respective bias acts, and a respective force-feedback fluid actuator driven by the respective valve system to move the respective anchor.

Preferably, each respective force-feedback system comprises a respective magnitude-adjustor to adjust a respective magnitude of a respective variation of the respective bias in relation to the respective load. The vehicle may comprise a magnitude user-interface by which the operator, whilst operatively engaged with the foot holds, can provide a single user-input to simultaneously adjust each respective magnitude-adjustor.

Each respective output leg is preferably mounted to swing fore and aft about a respective output hip. Preferably, each respective output leg has a respective ride-smoothing mechanical transmission by which the respective position-feedback FPS relative-length is varied in relation to a respective magnitude-of-departure of the respective output hip from a respective mid-stance position. Each respective output leg may comprise a respective adjustor to adjust a respective extent to which the respective position-feedback FPS relative-length is varied in relation to the respective magnitude-of-departure.

The control system may comprise a respective hip sub-system for each hip. Each respective hip sub-system may comprise
  a respective hip actuator arranged to effect a respective hip output movement corresponding to a respective hip input movement;
  a respective hip actuator-drive comprising a respective hip drive input movable to vary a respective drive to the respective hip actuator;
  a respective hip command mechanical transmission by which the respective hip input movement moves the respective hip drive input in a respective direction; and
  a respective hip position-feedback mechanical transmission by which the respective hip output movement moves the respective hip drive input a respective opposite direction opposite to the respective direction.

The respective hip output movement may be one of
  forward movement of the respective output leg about the respective hip; and
  rearward movement of the respective output leg about the respective hip.

Preferably, each respective hip sub-system comprises a respective see-saw link connected to each of
  the respective hip command mechanical transmission;
  the respective hip drive input; and
  the respective hip position-feedback mechanical transmission.

Optionally, each respective hip drive input is movable to reconfigure the respective hip actuator-drive to each of
  a respective advance configuration for advancing the respective hip actuator;
  a respective neutral configuration for stopping the respective hip actuator; and a respective reversal configuration for reversing the respective hip actuator.

Preferably, each respective hip actuator is a respective fluid actuator and each respective actuator-drive is a respective valve system.

Each respective hip sub-system may comprise a respective hip force-feedback system;
  each respective hip force-feedback system comprising a respective hip resilient portion arranged to be resiliently deformed by the hip actuator by a respective hip amount-of-deformation;
  a respective hip force-feedback mechanical transmission by which the respective hip amount-of-deformation urges the respective hip drive input to move.

Preferably, each respective output leg has a respective walk-assist mechanical transmission via which load borne by the respective output leg urges the respective hip drive input towards rearwardly moving the respective output leg.

The vehicle may comprise a vehicle-lowering member. Preferably, each respective hip command mechanical transmission comprises a respective hip control member mounted to move, relative to the vehicle-lowering member and in response to a respective user-input via a respective foot hold, to transmit movement to the respective hip drive input; and
  the vehicle-lowering member is movable simultaneously to
    move each respective hip control member; and
    vary each respective position-feedback FPS relative-length;
  and thereby lower the vehicle whilst legs of the operator remain extended.

Preferably, the control system is configured to extend each respective output leg by an amount, more than proportionate to a respective input extension, positively related to a respective magnitude-of-departure of the respective output hip from a respective mid-stance position to smooth a ride of the vehicle.

The vehicle may have a mode user-selectable to lower the vehicle whilst the legs of the operator remain extended.

Preferably, each respective output leg comprises a respective knee. Most preferably, each respective knee is rearwardly directed. Optionally, each respective output leg comprises a respective ankle driven by a respective one of the powered actuators in relation to the input movement. Preferably, each respective output leg is movable in abduction and adduction. Preferably, each respective output leg is movable toe-in and toe-out. Preferred variants of the control system may be configured to provide force-feedback to the operator via the foot holds. The control system may be configured to produce an output gait at least 20%, or preferably at least 100%, longer than an input gait. The vehicle may comprise a cabin to house the operator.

Preferably, the control system is configured to rearwardly bias each output leg in positive relation to weight borne by that leg. Most preferably, the relationship is so as to forwardly bias each output leg at least when it is fully relieved of weight.

The vehicle preferably comprises a restraint for restraining at least a portion of torso of the operator. The restraint may be arranged with respect to the foot holds to enable an operator to stand, on the foot holds, with a neutral posture. The vehicle may be configured to stand with a neutral stance in response to the operator standing with a neutral stance. Preferably, the restraint is configured to constrain the torso to about pivot about a lateral axis coincident with a centre of mass of the operator.

BRIEF DESCRIPTION OF THE DRAWINGS

FIGS. 2 and 3 are perspective views showing selected major components;
FIG. 4 is a side perspective view of an output hip;
FIG. 5 is a rear perspective view of an operator restraint;
FIG. 6 is a side view of a flex mount;
FIG. 7 is a side perspective view of a leg;

FIG. 8 is a perspective view of an ankle;

FIG. 9 is a front view of a groin;

FIG. 10 is a side view of a hip;

FIG. 11 is a front perspective view of a pair of input legs;

FIG. 12 is a rear perspective view of an input hip;

FIG. 13 is a front perspective view of an input hip;

FIG. 14 is a front-left perspective view of a knee control unit;

FIG. 15 is a front-right perspective view of the knee control unit;

FIG. 16 is a rear-left perspective view of the knee control unit;

FIG. 17 is an enlargement of a right-rear portion of the knee control unit;

FIG. 18 schematically illustrates an ankle control system;

FIG. 19 schematically illustrates a hip-flexor control system;

FIG. 20 is a perspective view of a hip-flexor control unit;

FIG. 21 schematically illustrates a hip-abduction control system;

FIG. 23 illustrates vehicle legs at the start of a swing phase;

FIG. 24 illustrates a ride-smoothing system at mid-stance;

FIG. 25 illustrates the ride-smoothing system at toes-off;

FIG. 26 illustrates the ride-smoothing system at toes-off and adjusted to 0% effect;

FIG. 27 is a side view of a vehicle leg at full squat;

FIG. 28 is a perspective view of a vehicle-lowering system configured for lowering;

FIG. 29 is a perspective view of an end portion of the vehicle-lowering system of FIG. 28;

FIG. 30 is a perspective view of the vehicle-lowering system in its operative configuration;

DETAILED DESCRIPTION OF THE INVENTION

Figure 1:
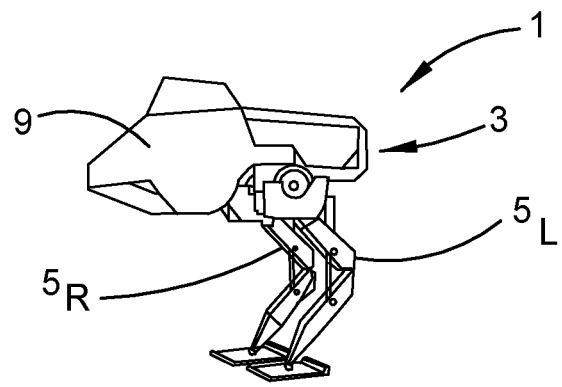
FIG. 1 is a perspective view of one example of a vehicle.

The vehicle 1 comprises a body 3 supported by legs $5_L$, $5_R$ controlled by control system 7. The body 3 comprises a cabin 9 for housing an operator. Preferably, the cabin 9 is fully enclosed to shield the operator from the elements, etc. The cabin may comprise a windscreen. For military applications, the cabin might be armoured.

The vehicle comprises a chassis 11 carrying a combustion engine 13 and a fuel tank 15. The engine drives a hydraulic pump 17. In other variants of the vehicle 1, components 13, 15 might be replaced by batteries and an electric motor, and hybrid systems are also possible. Variants of the vehicle 1 capable of operating in electric-only (or other emission-free) mode may be preferable for operation in confined spaces, such as in the context of mining applications.

Preferably, the cabin is forward-mounted to counterbalance other rearward components and to give the operator a better view of what lies ahead. For this purpose, the cabin may have low-mounted windows akin to the low-mounted windows in the vicinity of a helicopter's pedals.

A restraint 19 is mounted in the cabin to restrain an operator's torso. In this example, the restraint comprises a back rest 21, shoulder straps 25, and a waist band 27. There are other options. By way of example, an operator might be strapped into a harness akin to a parachute harness. Indeed, a means of locating, such as a seat akin to a bicycle or unicycle seat, might be employed to locate the operator's body in conjunction with, or as an alternative to, a restraint.

The restraint comprises a fixed piece 29 fixed relative to the chassis 11 and carrying three pairs of rollers 31. The rollers 31 sit within arcuate slots 33 formed in fore-aft vertical flanges 35 fixed to a rear of the back rest 21. The arcuate slots 33 are concentric to point 37 oriented to be about coincident with a centre of mass of the operator. In this way, when the operator is strapped in, the operator's torso is about restrained to about pivot about their centre of mass about a lateral axis.

The left leg $5_L$ comprises femur $39_L$, knee $41_L$, tibia $43_L$, ankle $45_L$ and foot $47_L$. The right leg $5_R$ comprises corresponding components $39_R$, $43_R$, $43_R$, $45_R$, $47_R$.

Left input leg $49_L$ and right input leg $49_R$ are also mounted within the cabin 9. The left input leg $49_L$ comprises an input femur $51_L$, and input knee $53_L$, an input tibia $55_L$, an input ankle $57_L$ and an input foot hold $59_L$. The right input leg $49_R$ comprises corresponding components $51_R$, $53_R$, $55_R$, $57_R$, $59_R$. The foot holds $59_L$, $59_R$ may comprise foot straps or other securements.

Preferably, the input legs are of corresponding configuration to the output legs (e.g. comprise 90° posterior knees in this case), and are designed and sized to ergonomically capture the gait cycle of the operator for transference, via the control system 7, to the output legs $5_L$, $5_R$.

Whilst other input arrangements are possible, preferably each output joint has a corresponding input joint. Preferably, there is position-feedback connecting each corresponding two of the joints. Most preferably, there is also force-feedback between each corresponding two of the joints.

Figure 9:
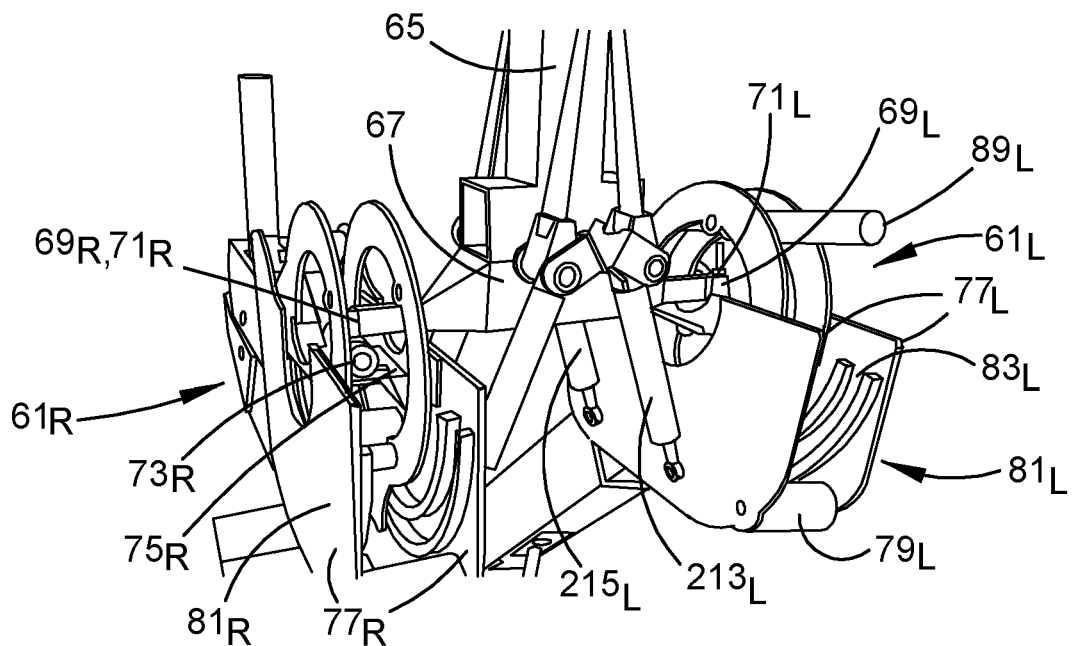
Figure 10:
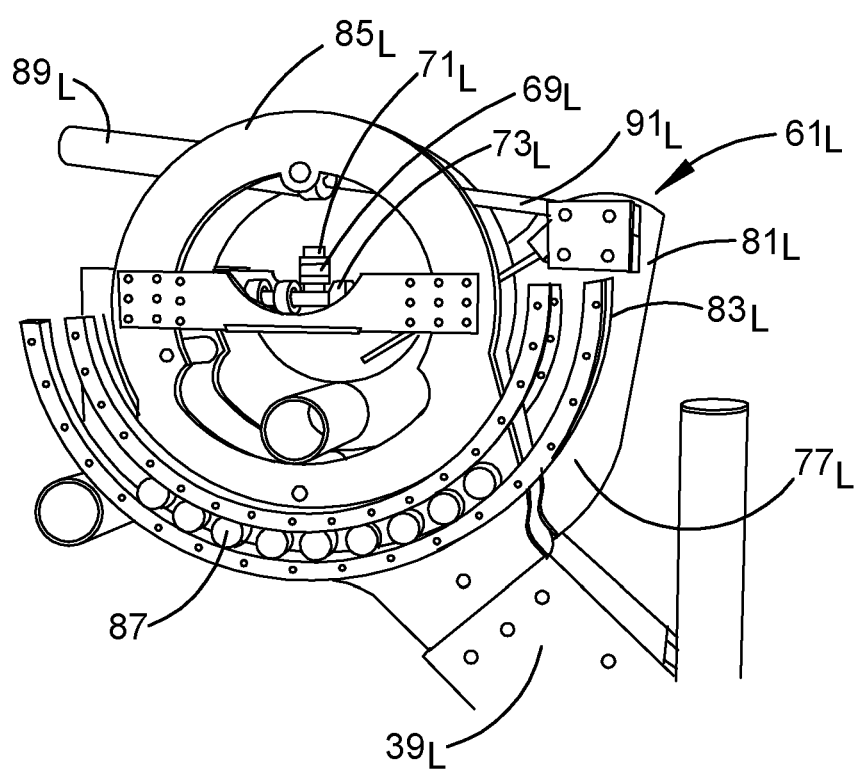

The output legs $5_L$, $5_R$ are connected to the chassis 11 via output hips $61_L$, $61_R$. The chassis 11 comprises chassis rails 63, upright 65 and cross member 67 (FIG. 9). The cross member 67 runs laterally across the vehicle 1 and has an upright journal $69_L$, $69_R$ at each end. Each journal $69_L$, $69_R$ pivotally carries a respective inverted T pieces $71_L$, $71_R$.

The horizontal arms of the T pieces $71_L$, $71_R$ are journaled to rotate within pillow blocks $73_L$, $73_R$ which blocks are in turn fixed to webs $75_L$, $75_R$. Each web $75_L$, $75_R$ mutually connects a respective pair of pelvis plates $77_L$, $77_R$. The two pelvis plates $77_L$ are mutually parallel and fixed in mutually spaced relation by the web $75_L$ and spacers $79_L$. The web $75_L$, pelvis plates $77_L$ and spacers $79_L$ thus together constitute a pelvis unit $81_L$ gimballed to rotate about the horizontal and vertical axes of the T piece $71_L$. The right-hand pelvis unit $81_R$ has a corresponding construction. Other forms of pelvis unit are possible.

The femur $39_L$ is mounted to rotate about a generally lateral axis with respect to the pelvis unit $81_L$. In this case, the pelvis unit 81 defines arcuate bearing tracks $83_L$ whilst a femur head $85_L$ of the femur $39_L$ carries an arcuate array of rollers $87_L$ to roll along the bearing tracks $83_L$. An actuator $89_L$ acts between the femur $39_L$ and the pelvis unit $81_L$. More specifically, the actuator acts between an upper portion of the femur head $85_L$ and the pelvis unit $81_L$. The femur head $85_L$ comprises a pair of parallel plates mutually spaced in a lateral direction to accommodate the actuator $89_L$ therebetween. The actuator $89_L$ is trunnion-mounted to pivot about a transverse pivot axis at the front of its main body from which front its actuator rod $91_L$ extends. The actuator $89_L$ is actuatable to drive the leg $5_L$ fore and aft about a generally lateral axis.

In this case, the vertical and horizontal axes of the T piece $71_L$ and the generally lateral axis (concentric to the bearing track $83_L$) about which the femur $39_L$ rotates substantially intersect at the junction of the inverted T piece $71_L$.

Figure 7:
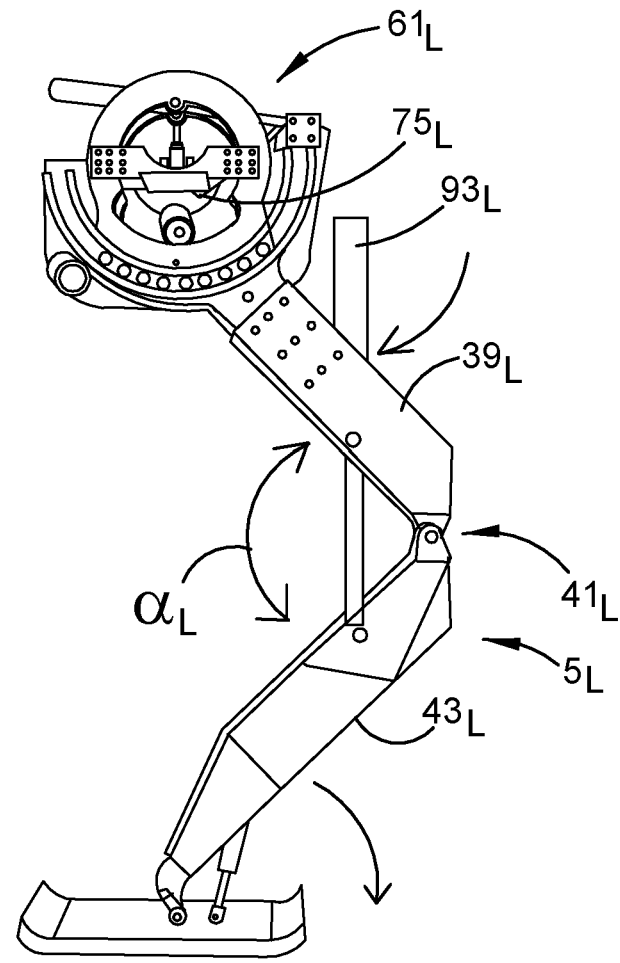

Turning to FIG. 7, the left knee $41_L$ mutually connects the femur $39_L$ to the tibia $43_L$. The knee $41_L$ is a simple single-pivot joint. This construction is preferred because it is simple and robust, although other options (such as a polycentric gear joint) are possible. In this example, the knee $41_L$ is rearwardly directed (unlike a human knee which is forwardly directed) and is configured to work through a range of motion $\alpha_L$ of 0° to about 120°.

Actuator $93_L$ acts between components $39_L$, $43_L$ to open and close the knee $41_L$. In this example, the actuator $93_L$ is inverted and trunnion-mounted. Preferably, the knee $41_L$ is extended to about 90° (say 90°±10°) when the vehicle is standing with a neutral stance and when the leg is mid-stance as the vehicle is walking. Beyond 90°, the effectiveness of the self-aligning actuator $93_L$ may be diminished by the changing geometry about the knee.

A lower end of the actuator is received within the tibia $43_L$ and is equipped with a flex mount $95_L$. The flex mount $95_L$ comprises a body $97_L$ pivotally connected to the rod end of the actuator $93_L$. The body is also pivotally connected via pins $99_L$ to the tibia $43_L$. The axes of these two pivotal connections are offset whereby load from the actuator $93_L$ produces a corresponding bending moment about the pin $99_L$. A resilient arm $101_L$ projects from the body $97_L$, along the tibia $43_L$ to a mounting point $103_L$ fixed to the tibia $43_L$. The resilient arm $101_L$ is a cantilevered leaf spring to resist the bending moment about the pin $99_L$. The resilient arm $101_L$ may be formed of spring steel.

A push-pull cable is connected between the tibia $43_L$ and the body $97_L$ to be driven in relation (e.g. proportion) to the angle of the body $97_L$ relative to the tibia $43_L$ and thereby to provide force-feedback indicative of the force supplied by the actuator $93_L$. In this way, the force applied by the actuator $93_L$, the deformation of the resilient arm $101_L$, the rotation of the pin $99_L$ and the displacement of the push-pull cable are related quantities. In this case, a sheath of the push-pull cable is fixed relative to the tibia $43_L$ and a core of the push-pull cable and movable relative to the sheath is fixed to the body $97_L$.

Figure 8:
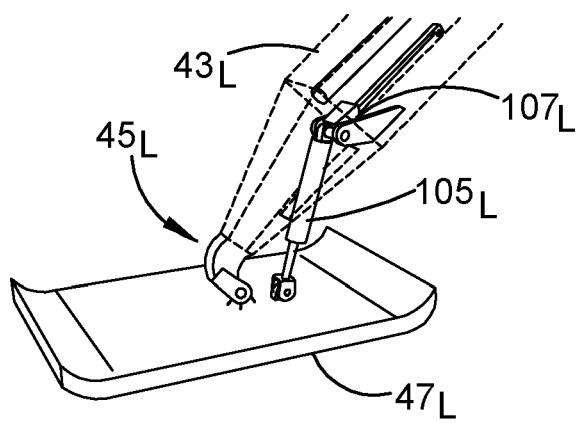

As shown in FIG. 8, the ankle $45_L$ is another simple pivotal connection and comprises an actuator $105_L$ to act between the tibia $43_L$ and the foot $47_L$ via a flex mount $107_L$. The foot $47_L$ comprises a horizontal plate which, in this example, is rectangular. A variety of aspect ratios, e.g. square, is possible, although preferably the foot $47_L$ is about twice as long as it is wide. In this example, the plate $47_L$ has upturned leading and trailing edges akin to ski tips. Advantageously, the foot $47_L$ is dimensioned with respect to a dry, unladen weight of the vehicle so as to present not more than 70 kPa to the ground when the foot $47_L$ is bearing an entire weight of the vehicle 1.

More elaborate ankle configurations are possible. By way of example, the foot plate $47_L$ might be mounted to rotate (with respect to the tibia $43_L$) about a longitudinal axis as well as a lateral axis. On the other hand, simpler variants are also possible. The actuator $105_L$ might be replaced by a gas spring (or the foot $47_L$ might be otherwise resiliently connected to the tibia $43_L$) to simply deform to match the ground contours. Indeed, some variants of the vehicle 1 may do without ankles, e.g. the foot $47_L$ might take the form of a resilient sphere fixed at the lower end of the tibia $43_L$.

Figure 11:
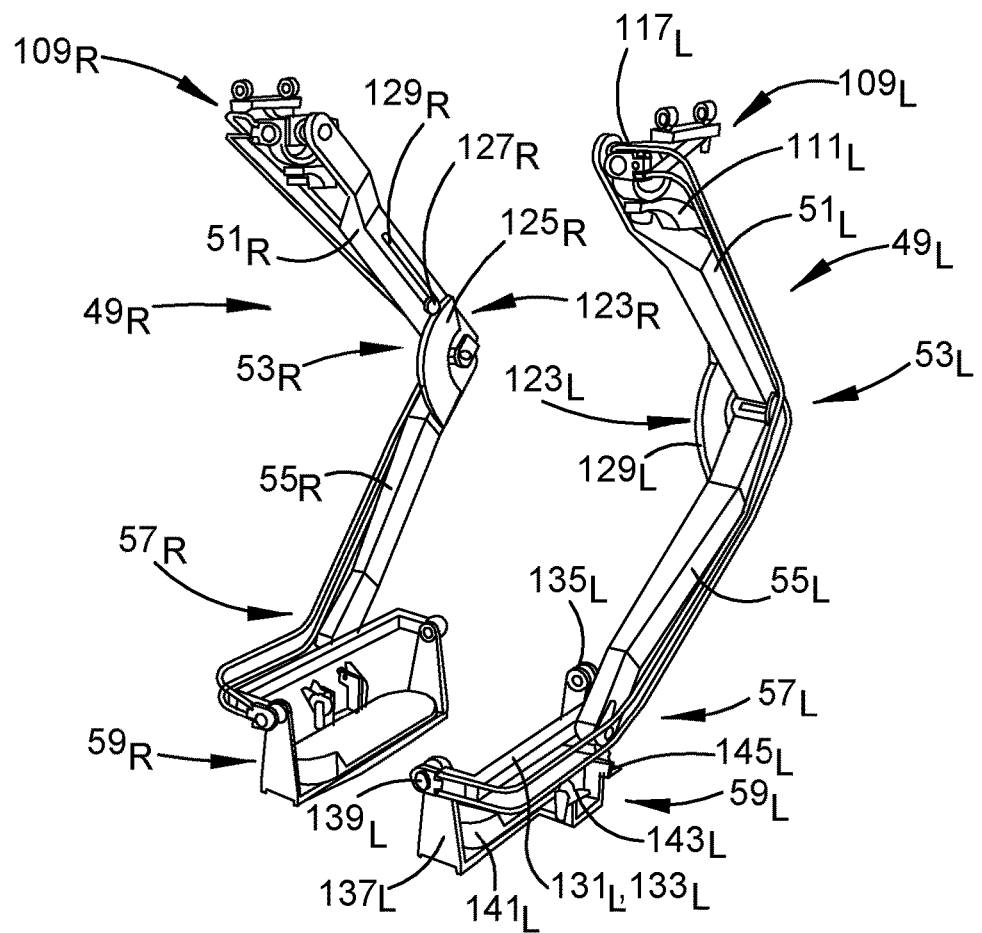

The input legs $49_L$, $49_R$ are suspended from input hip gimbals $109_L$, $109_R$ (FIG. 11). The gimbal $109_L$ comprises a fixed portion $111_L$ fixed with respect to the chassis 11. Yoke $113_L$ sits atop the fixed portion $111_L$ and is pivotally connected to pivot about an upright axis. The arms of the yoke $113_L$ project upwardly to accommodate pelvis unit $115_L$. The pelvis unit $115_L$ is mounted between the arms of the yoke $113_L$ to pivot horizontally about a generally fore-aft axis. A rotary $117_L$ sits on an outside face of one arm of the yoke $113_L$ to drive push-pull cables in relation to the orientation of the pelvis unit $115_L$ about this horizontal pivot axis. The femur $51_L$ is mounted on the inside of the pelvis unit $115_L$ and pivotally connected thereto to pivot about a generally horizontal, generally lateral, axis. A rotary $119_L$ drives a push-pull cable in relation to an angular orientation of the femur $51_L$ about this horizontal, generally lateral, axis. On its outboard side, the pelvis unit 115 carries a pair of attachment points 121 mutually spaced in the fore-aft direction. Preferably, the pelvis units $115_L$, $115_R$ (or more specifically, the generally fore-aft pivot axes of those units in this case) are spaced in the range of 600 mm±100 mm, preferably 600 mm±50 mm, or more preferably 600 mm±25 mm.

The input knee $53_R$ is a rearwardly-directed knee comprising a simple pivotal connection. Preferably, the input knees are limited to a maximum extension in the range of 90°±10°. Preferably, a maximum extension of each input leg corresponds to a maximum distance between the generally transverse pivot axes of the hip and the ankle in the range of 830 mm±100 mm, more preferably in the range of 830 mm±50 mm.

A take-up arrangement $123_R$ is associated with the knee $53_R$. The arrangement $123_R$ comprises an arc $12_R$ fixed to the tibia $55_R$ and concentric to the knee $53_R$, and a pulley $127_R$ radially adjacent the arc $125_R$. A portion of a control cable $129_R$ is fixed with respect to the tibia $55_R$ wherefrom free portions of the cable wrap about the exterior of the arc $125_R$ and then turn about the pulley $127_R$. In this way, the take-up arrangement $123_R$ takes up (in this case pulls about pulley $127_R$) a length of the cable $129_R$ proportional to an opening of the knee $53_R$.

The foot hold $59_L$ comprises a cradle support $131_L$ that includes a portion $133_L$ running in the fore-aft direction and pivotally connected to the tibia $55_L$ at ankle $57_L$. A projection $135_L$ projects inwardly from each end of the fore-aft portion 133. A cradle $137_L$ comprising a generally planar floor is suspended between the projections $135_L$ and pivotally connected thereto so as to pivot, with respect to the cradle support $131_L$, about a fore-aft axis. The cradle support $131_L$ carries a rotary $139_L$ connected to rotary $117_L$ by push-pull cables to hold the cradle $137_L$ (as characterised by its generally planar floor) substantially lateral with respect to the chassis 11.

The planar floor of the cradle $137_L$ carries a foot plate $141_L$. The foot plate is mounted to slide on the floor of the cradle so that it has a small degree of freedom to move laterally and twist (about a generally upright axis) with respect to the cradle 137.

Preferably, the foot hold $49_L$, as characterised by the top foot-receiving surface of the foot plate $141_L$, is in the range of 120 mm±70 mm (or more preferably 120 mm±25 mm) below the generally transverse pivot axis of the input ankle $57_L$.

The foot holds $59_L$, $59_R$ are mounted inboard of their corresponding tibias and femurs so that the operator can fit between the tibias and femurs and, when the operator stands with their feet shoulder-width apart, so the operator's legs are about straight up and down, the tibias and femurs of the input legs are also about straight up and down.

Rotaries $143_L$, $145_L$ are mounted along the cradle $137_L$ and co-operate with feelers in contact with the foot plate $141_L$ to drive push-pull cables in response to the foot plate $141_L$ moving relative to the cradle $137_L$. The output knee $41_R$ internally carries a take-up arrangement (not shown) akin to the take-up arrangement $123_R$ but configured to take up the cable $129_R$ as the output knee $41_R$ closes. The actuator $93_R$ is driven to open the knee $41_R$ so as to maintain a tension in the cable $129_R$.

Figure 14:
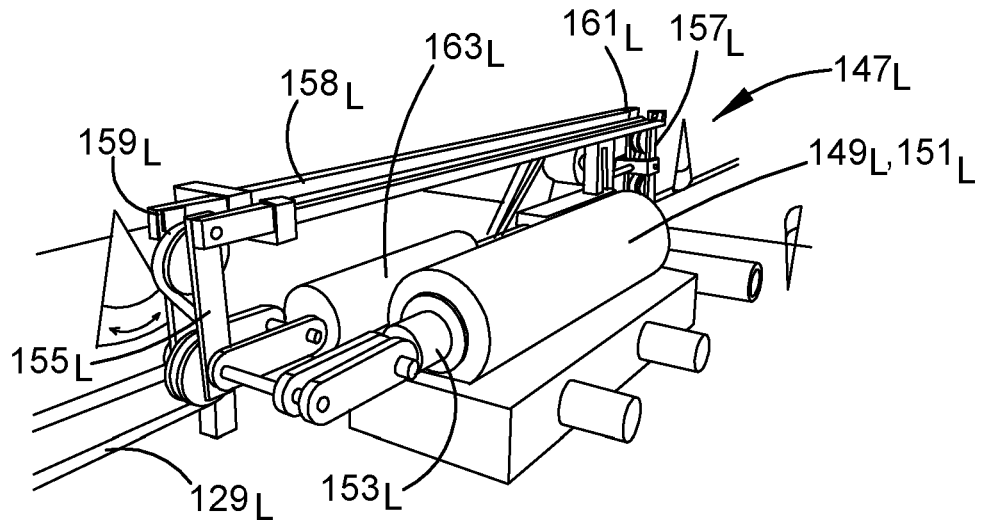

Each output leg $5_L$, $5_R$ is associated with a respective knee control unit. In this example, the knee control units are carried by the femurs. The knee control unit $147_L$ can be seen attached to the femur $39_L$ in FIG. 2 and is illustrated in more detail in FIGS. 14 to 16. The knee control unit $147_L$ comprises an actuator drive in the form of a hydraulic spool valve $149_L$. The valve $149_L$ comprises a valve body $151_L$ and an input shaft $153_L$ projecting from the valve body.

The valve $149_L$ is, in this example, a proportional spool valve for driving the actuator $93_L$ in relation to a position of the input shaft $153_L$. The valve $149_L$ has a neutral position at which the actuator $93_L$ is not driven one way or the other. The further that the input shaft $153_L$ is moved from its neutral position, the harder the actuator $93_L$ is driven.

The knee control unit further comprises an input link $155_L$, a null link $157_L$ and a support structure $158_L$ fixed relative to the valve body $151_L$. The support structure $158_L$ runs parallel to a stroke of the input shaft $153_L$ to mutually space pivotal connections $159_L$, $161_L$ by which the links $155_L$, $157_L$ are mounted to pivot with respect to each of the valve body $151_L$ and the superstructure $158_L$. Each of the links $155_L$, $157_L$ carries a pair of pulleys.

The pulleys of the input link $155_L$ are spaced along that link (with respect to the pivotal connection $159_L$). Cable $129_L$ (akin to the cable $129_R$) is routed in an S-shaped path about these two pulleys so that tension in the cable $129_L$ urges the link $155_L$ to rotate clockwise as drawn in FIG. 14. As the link $155_L$ moves in this way, the length of the path about which the cable $129_L$ is routed is reduced. A tension spring $163_L$ is connected to the input link to counteract this movement (i.e. to urge the link $155_L$ to rotate counterclockwise as drawn).

The input shaft $153_L$ is arranged to be moved in relation to the outcome of the tension in the cable $129_L$ working against the spring $163_L$. In this case, the input shaft $153_L$ and a yoke-like extension of the spring $163_L$ are both dowelled to an axle of the lower pulley of the link $155_L$.

The valve $149_L$ is a spool valve that takes power from the hydraulic pump 17 and forcibly drives the actuator $93_L$ in either direction, dependent on the position of the input shaft $153_L$. The valve $149_L$ also has an intermediate, neutral, position at which fluid flow to and from the actuator $93_L$ is blocked off, whereby the actuator holds the knee $41_L$ at a select position without consuming power.

The valve $149_L$ is oriented so that, when a user depresses the foot hold $59_L$ and thereby opens the input knee $53_L$ and causes the take-up arrangement $123_L$ to take up cable $129_L$, tension in the cable is increased, the link $155_L$ moves (clockwise as drawn in FIG. 14) to cause the valve $149_L$ to drive the actuator $93_L$ to open the knee $41_L$ until the take-up arrangement (not shown) on the knee $41_L$ releases sufficient cable to restore steady-state tension in the cable, whereupon the link $155_L$ and in turn the valve $149_L$ returns to its neutral position.

The null link $157_L$ also carries a pair of pulleys about which the cable $129_L$ is routed in a manner akin to the routing about the pulleys of the link $155_L$. The link $157_L$ is restrained from pivoting in response to tension in the cable $129_L$ by a multiplier assembly $165_L$. The multiplier assembly $165_L$ comprises a multiplier link $167_L$ and con rod $169_L$.

The multiplier link $167_L$ comprises a crank shaft portion (horizontal as drawn) mounted to pivot relative to the valve body $149_L$ about a pivot axis parallel to the pivot axes of the pivotal connections $159_L$, $161_L$. A slotted crank portion projects from the shaft portion. The con rod $169_L$ mutually connects this crank portion to the null link $157_L$ to ensure components $157_L$, $167_L$ move in unison.

A trim adjuster $171_L$ connects the spring $163_L$ to the multiplier link $167_L$ or more specifically to the crank portion of that link in this case. The flex mount $95_L$ is connected to the crank shaft portion of the multiplier link $167_L$ via a push-pull cable (not shown) so that the link $167_L$ is driven to rotate and thereby extend the spring $163_L$ in response to the load applied by the actuator $93_L$.

The crank portion of the multiplier link $167_L$ is an anchor against which the spring $163_L$ acts. Other forms of anchor are possible. By way of example, the trim adjuster may be directly connected to the null link $157_L$ to anchor the spring $163_L$ thereto. In this case, the force-feedback from the flex mount $95_L$ may be applied directly to the null link $157_L$.

The push-pull cable connecting the flex mount $95_L$ to the multiplier link $167_L$ is an example of a mechanical transmission. Other forms of mechanical transmission are possible. Indeed, other feedback systems more generally are possible. By way of example, an encoder on the flex mount $95_L$ may relay control signals to a relatively small actuator on the multiplier link $167_L$.

However the multiplier link $167_L$ is rotated, as a result of the spring $163_L$ being extended, the input link $155_L$ is retracted to extend the cable path which increases tension in the cable and tends to lift the foot hold $59_L$. To counteract this, the operator must push harder down on the foot hold $59_L$ to hold the actuator $93_L$ in its neutral position, whereby the user experiences force-feedback related to the force applied by the actuator $93_L$.

When load is applied to the output leg $5_L$, force-feedback is provided via the flex mount $95_L$ that tends to increase the tension within the control cable $129_L$. This feedback is associated with some deformation within the flex mount, which deformation also tends towards increasing the cable tension by the cable take-up arrangement on the knee $41_L$ taking up some more cable as a result of the "uncommanded" closure of the knee. This tension could cause the actuator $93_L$ to drive harder, whereby there is the potential for an undesirable runaway effect. Preferred variants of the null link $157_L$ prevent this potential runaway effect by shortening the cable path by an amount corresponding to the amount of cable taken up by the take-up arrangement of the knee as a result of the movement associated with the flexing of the flex mount.

The knee control unit $147_L$ enables two distinct force-feedback adjustments. Firstly, the trim adjuster $171_L$ is length-adjustable to adjust a preload on the spring $163_L$. Typically, this adjustment would be configured when an operator first takes to the machine. Preferably, the preload is initially relaxed. An operator then stands on the foot holds $59_L$, $59_R$ so that, without adequate preload, the input legs $49_L$, $49_R$ reach a base of their range of movement. The input knees $53_L$, $53_R$ are restricted to 90° ranges of movement in this example. From a user interface in the cabin, and whilst standing on the foot holds, the operator shortens trim adjusters $171_L$, $171_R$ until they can feel upward force-feedback through the foot holds as the cable $129_L$ is tightened to take the user's weight away from the stop by which the range of input knee movement is limited. In this way, the force-feedback can be adjusted to suit operators of different weights.

Secondly, the trim adjuster is adjustable along the crank portion of the multiplier link $167_L$ to vary the extent to which the feedback force varies in response to variations in the load applied by the actuator $93_L$. Through these two mechanisms, the operator can adjust the baseline feedback force to suit their weight and can adjust the magnitude of the variation in that force to suit their preferences. Preferably, the con rod $169_L$ is also relocatable along the con rod of the multiplier link $167_L$ to give operators further scope to tune the response of the control system.

Other modes of adjustment are possible. By way of example, the spring $163_L$ may be a gas spring, the initial pressure and/or internal volume of which may be adjustable to vary a response of the knee control unit $147_L$.

The cable $129_L$ and the pulleys of the knee control unit $147_L$ together constitute a flexible pulling system. In principle, other flexible pulling elements (such as rope and/or chain) could be used instead of a cable. Preferably, the flexible pulling element is substantially unstretchable. In this example, the FPS mutually connects the input knee to the output knee (or more specifically, mutually connects the take-up arrangements of those knees). In other implementations of the concept, other mechanical transmissions might connect portions of the cable emerging from the links $155_L$, $157_L$ to the knees.

In this particular example, the take-up arrangements each comprise constant radii arcuate take-up members concentric to the pivot axes of the corresponding knees and the input take-up members have substantially the same radii as the output take-up members. In other variants, one or both of the input and output arcuate members might have an alternate form and/or be eccentrically mounted to vary the transfer function between the input and output systems. Indeed, entirely different take-up arrangements might be employed. By way of example, a straight run of cable might run from a point of fixation in the vicinity of one of the foot holds up and about a pulley in the vicinity of the corresponding input hip, whereby the length of that straight run is relatable to the desired leg extension. Likewise, instead of rotary $119_L$, a straight run of a cable might connect the foot hold $59_L$ to a pulley at about foot level behind the operator.

Preferred variants of the described mechanical systems are simple and robust and provide quality tactile feedback to the operator, although other options are possible.

By way of example, encoders may be associated with each of the input joints and the actuators may be electronically controlled in response to the encoders. Indeed, variants without the input legs are also contemplated. By way of example, control cable and/or encoders may be associated with input foot holds that are supported from below.

The cable $129_L$ operates in tension, tending to lift the input foot hold $59_L$. Other arrangements are possible. By way of example, the cable might operate in tension to counteract a spring tending to lift the input foot hold $59_L$.

As noted, the knee actuator $93_L$ is controlled in response to tension in the cable $129_L$. This is preferably implemented using an actuator drive (in the form of hydraulic valve $149_L$) having a neutral position at which the position of the actuator is substantially fixed without drawing power. Of course, other forms of actuator are possible and there are other forms of actuator capable of holding position without drawing power. By way of example, a pneumatic actuator or a worm drive might be employed.

In this example, the actuator $93_L$ takes the form of a single hydraulic ram. Other arrangements are possible. By way of example, the actuator might take the form of a pair of rams arranged in parallel or otherwise teamed to effect a desired movement. As the wording is used herein, hydraulic rams, pneumatic rams, ball screws and teams of these things are all examples of powered actuators, and a simple spring is not an example of a powered actuator.

The flex mount $95_L$ is a convenient means for providing force-feedback. The flex mount $95_L$ and the other flex mounts of the vehicle 1 are examples of mechanical force-feedback sensors. There are other options. By way of example, the sheath and the core of a push-pull cable may be connected to opposite ends of a helical compression spring mounted in series with an actuator. Wholly electronic control systems that do without cables or other forms of mechanical transmission can be configured to provide force-feedback. By way of example, a strain gauge mounted at any convenient point on the tibia may provide output relatable to the load borne by the leg and/or the output of the actuator on the knee of that leg. There are also intermediate electromechanical options. By way of example, a respective load cell might be mounted in series with each of the actuator $93_L$ and the cable $129_L$ and a logic system may drive the actuator $93_L$ so as to maintain a relativity between the outputs of these load cells.

In the knee control unit $147_L$, the valve $149_L$ is essentially mounted in parallel to the combination of the spring $163_L$ and multiplier assembly $165_L$, etc. A rudimentary knee control unit might take the form of a tension spring interrupting the cable $129_L$ and a valve (or other actuator drive) mounted in parallel to that spring. A trinary output valve $149_L$ (as opposed to a proportional valve) is another option.

Figure 2:
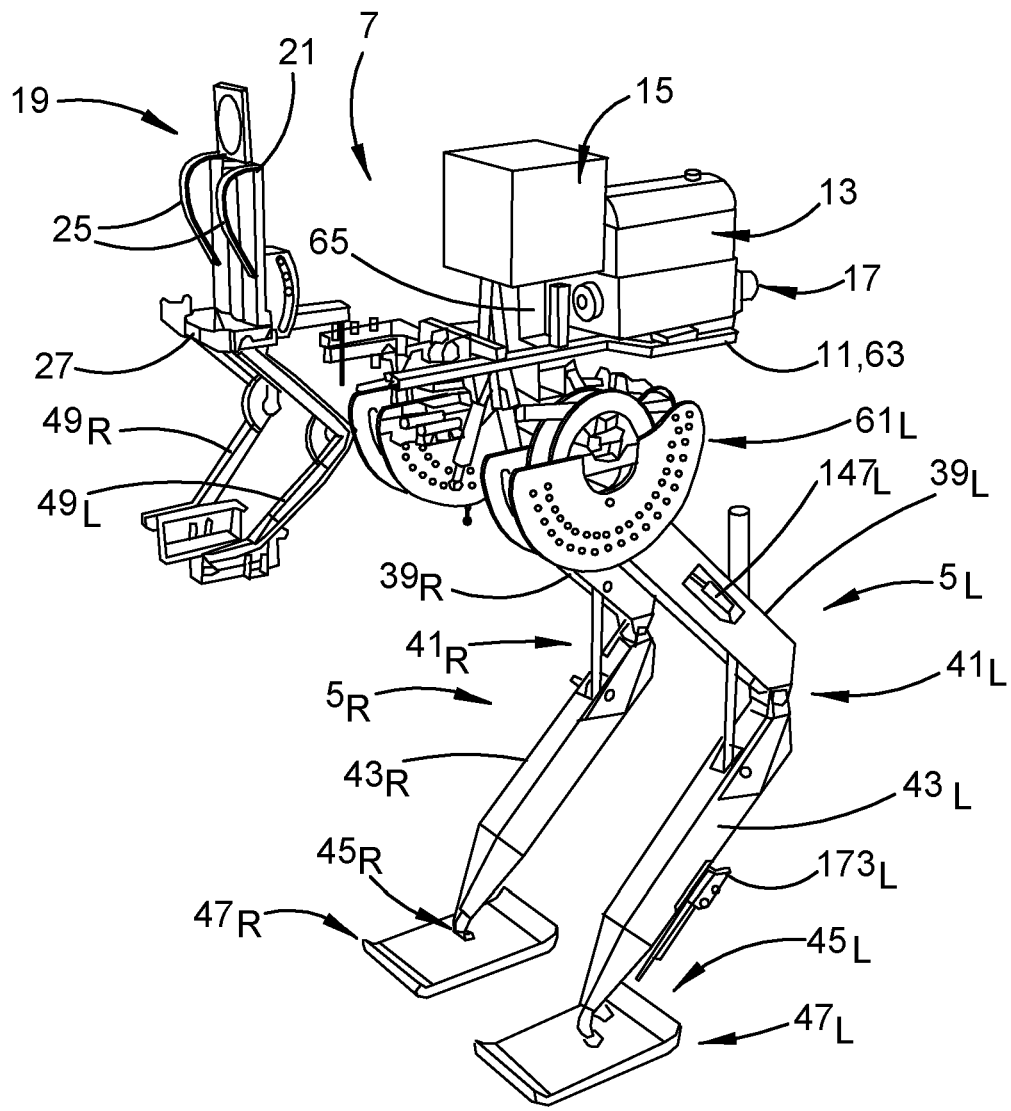
FIGS. 2 to 21 and 23 to 30 show selected components of the vehicle of FIG. 1.
Figure 3:
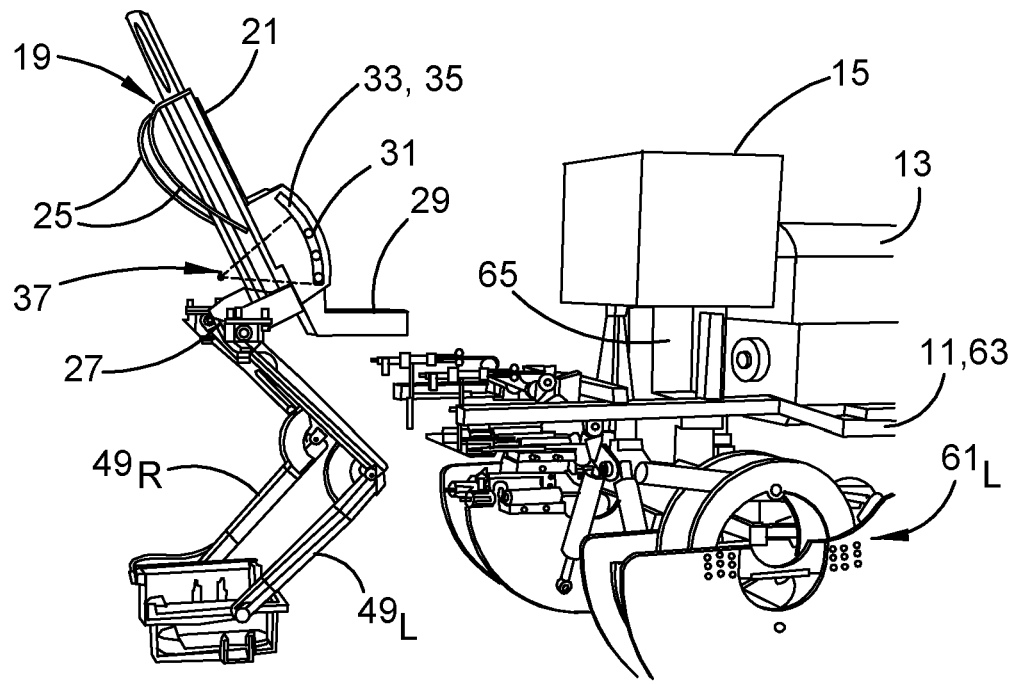
Figure 4:
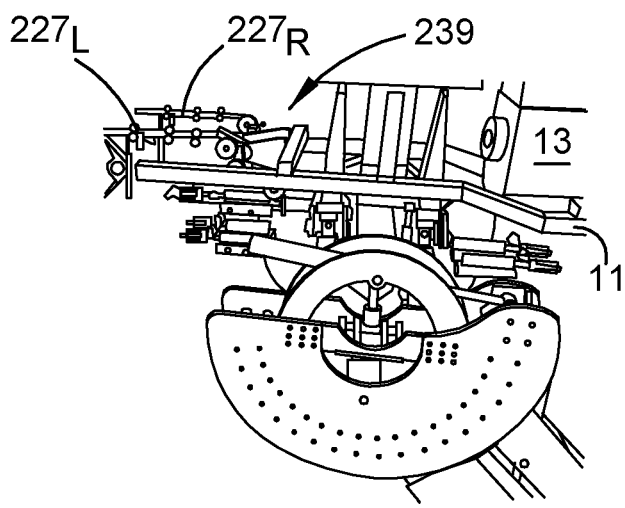
Figure 5:
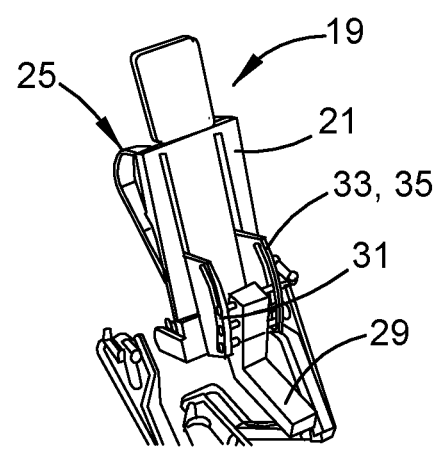
Figure 6:
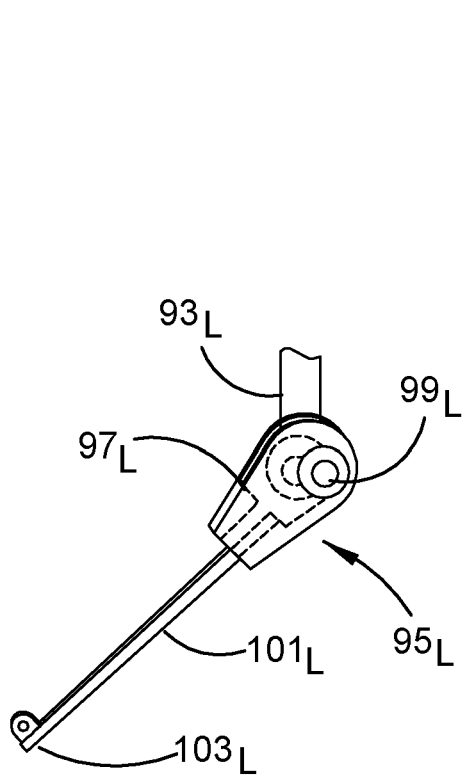
Figure 18:
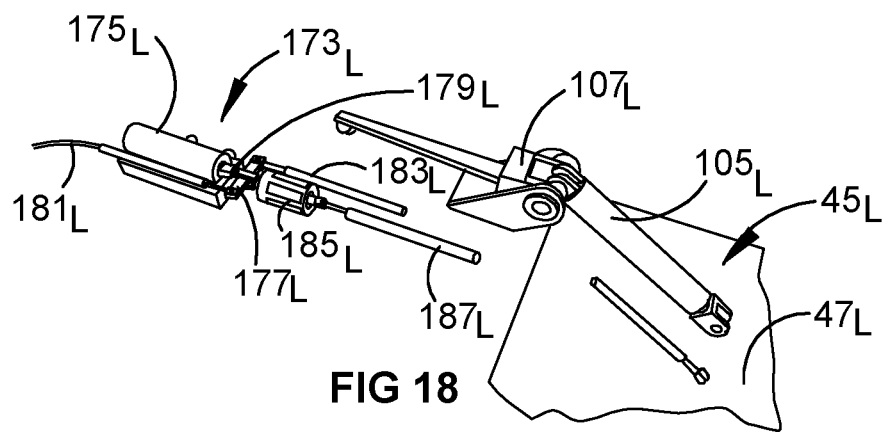

An ankle control unit $173_L$ is carried on the tibia $43_L$ (FIGS. 2 and 18). The ankle control unit $173_L$ comprises an actuator drive in the form of a valve $175_L$ akin to the valve $149_L$. A see-saw link $177_L$ is connected to the input shaft $179_L$. The see-saw link $177_L$ projects transversely either side of the input shaft $179_L$. On one side, the see-saw link is connected to a push-pull cable $181_L$ that is driven by the rotary on the input ankle $57_L$. On the other side of the input shaft $179_L$, the see-saw link $177_L$ is connected to push-pull cable $183_L$, which cable connects to the output foot $47_L$ to provide feedback on the angular position of the ankle $45_L$. Via the see-saw link $177_L$, the difference between an angle of the input ankle $57_L$ and an angle of the output ankle $45_L$ is applied to the valve $175_L$. The valve $175_L$ in turn drives the actuator $105_L$ whereby the output ankle $45_L$ tracks the movement of the input ankle $57_L$.

A spring unit $185_L$ comprises a yoke bracketing the see-saw link $177_L$ to connect to the input shaft $179_L$ in parallel to that link. The spring unit $185_L$ defines a resilient buffer between the input shaft $179_L$ and a push-pull cable $187_L$ connected to the flex mount $107_L$. In this way, the push-pull cable $187_L$ conveys translation related to the load applied by the actuator $105_L$ and the spring unit $185_L$ converts this translation to a force applied to the input shaft $179_L$. The spring unit $185_L$ provides a feedback force against which an operator must work to hold the input ankle $57_L$ at a desired position whereby, through the foot hold $59_L$, the operator can feel angular forces being applied through the ankle $45_L$.

Figure 33:
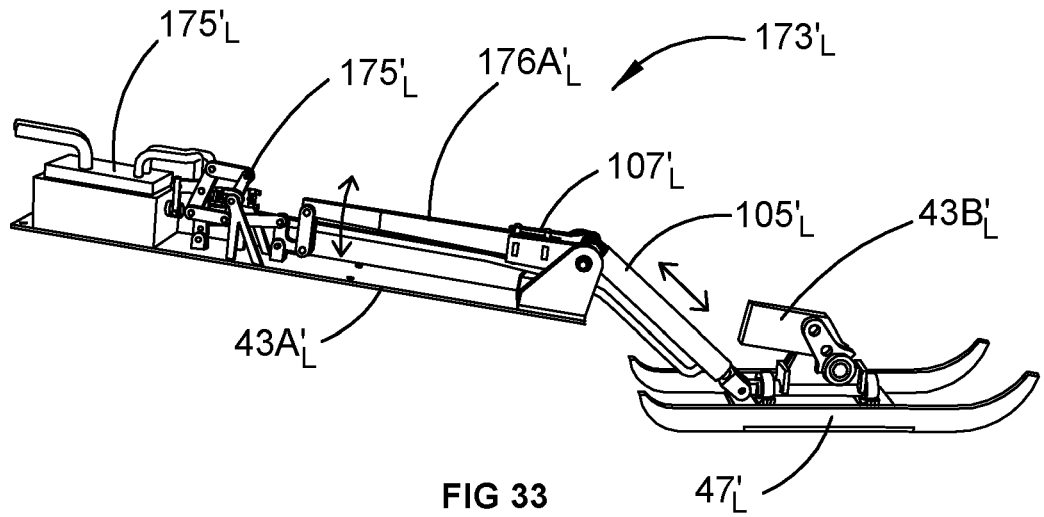
FIG. 33 is the perspective view of selected components of an ankle control system.
Figure 34:
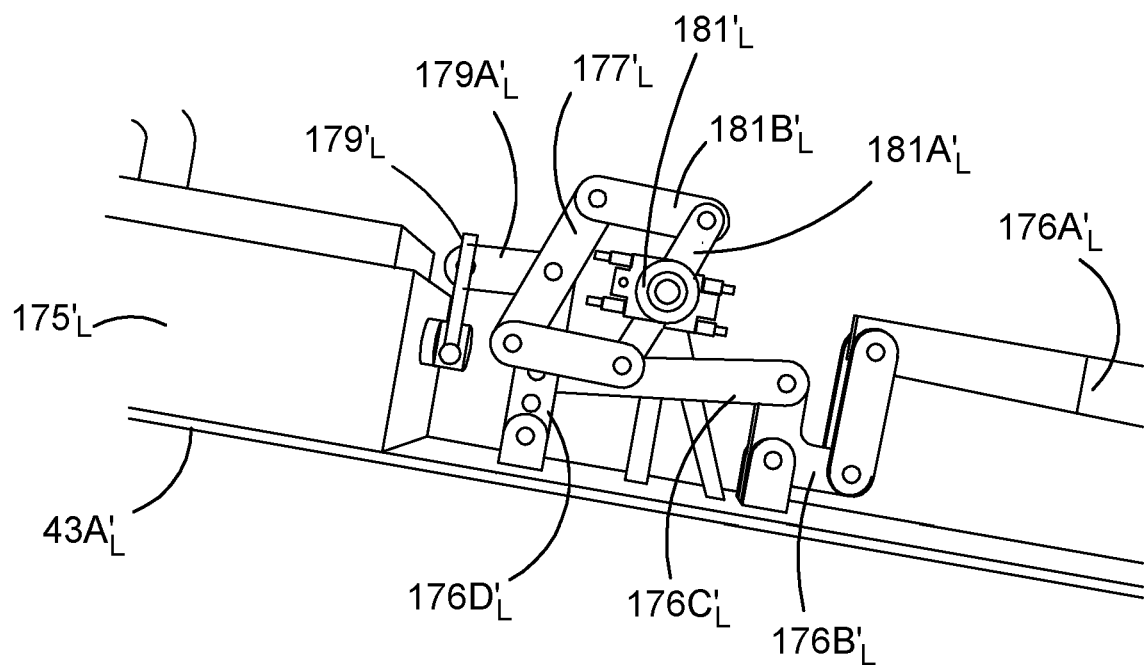
FIG. 34 is a side view of the linkage system of the ankle control system of FIG. 3.
Figure 35:
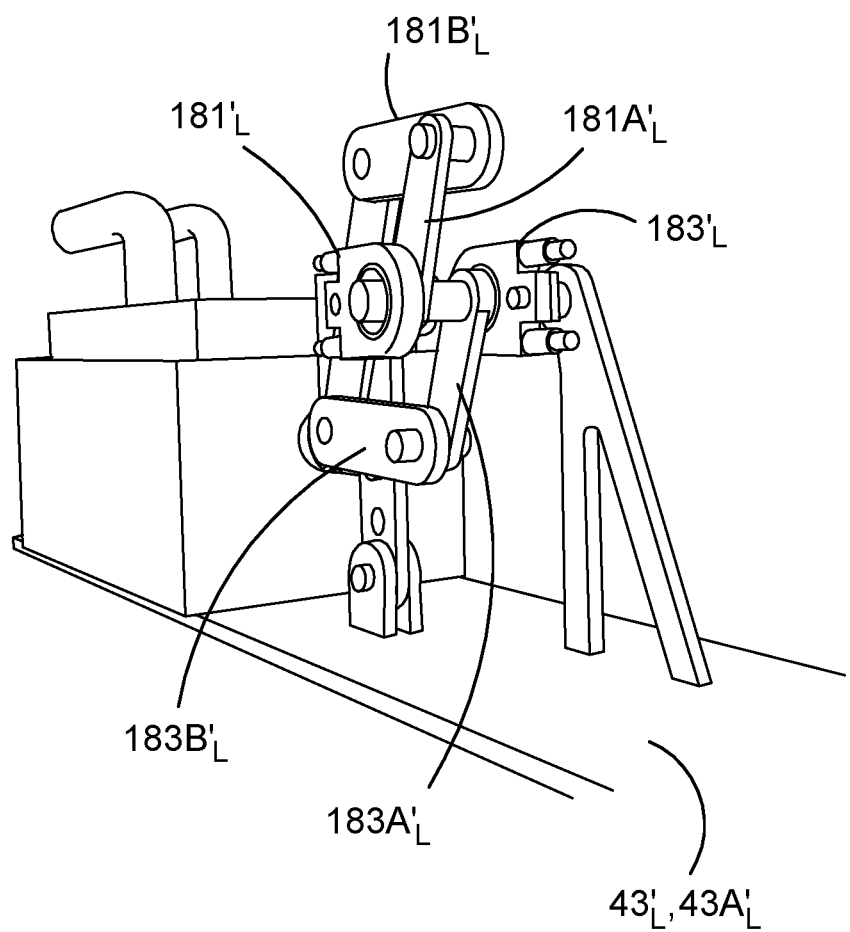
FIG. 35 is a perspective view of the rotaries of the ankle control system of FIG. 33.

FIGS. 33 to 35 illustrate an alternative ankle control system $173_L'$. The ankle control unit $173_L'$ is configured to provide force feedback without resilient elements akin to the resilient arm of the flex mount $107_L$ or to the spring unit $185_L$. In this way, preferred variants of the ankle control unit $173_L'$ may provide more accurate force feedback.

Tibia portions $43A_L'$ and $43B_L'$ are portions of a tubular tibia member which houses much of the control unit $173_L'$. Much of the tubular tibia is omitted from FIG. 33 to reveal the details of the ankle control system $173_L'$.

A hydraulic cylinder $105_L'$ acts between the foot $47_L'$ and the tibia portion $43A_L'$. The cylinder $105_L'$ connects to the tibia portion $43A_L'$ via an eccentric mounting $107_L'$ whereby the actuator force leads to a corresponding torque about the axis of the mounting.

A set of linkages $176_L'$ connects the hydraulic cylinder $105_L'$ to a proportional valve $175_L'$. The set of linkages $176A_L'$ comprises an arm of the eccentric mounting $107_L'$ that extends generally parallel to the tibia, upwards therealong. A short link connects the free end of that arm to a bell crank $176B_L'$, which in turn connects to link $176C_L'$ which in turn connects to link $176D_L'$.

The link $176D_L'$ is mounted to pivot with respect to the tibia portion $43A_L'$ at one of its ends. At its other end, the link $176D_L'$ is connected to seesaw link $177_L'$ and to input link $179A_L'$. The input link $179A_L'$ in turn connects to input arm $179_L'$ of the valve $175_L'$.

The linkage system $176_L'$ defines a leverage ratio by which the force at the actuator $105_L'$ is reduced and applied to the centre of the seesaw link $177_L'$. In this case, the force is reduced by a factor of 48. Preferably each link of the linkage system $176_L'$ is rigid. Optionally components $174_L'$, $175_L'$, $176_L'$ may be assembled with respect to the tibia portion $47A_L'$ and then slid into a tubular housing portion of the tibia.

The control unit $173_L'$ may be adjustable to vary the force feedback to the user. In this example, the link $176_L'$ is pivotally connectable to any one of a plurality of mounting holes spaced along the length of the link $176B_L'$ whereby the force-reduction ratio can be adjusted to suit user preferences. Other modes of adjustment, such as the various options discussed in respect of the multiplier link $167_L$, may be incorporated in the ankle control unit $173_L'$.

Input rotary $181_L'$ connects the ankle control unit $173_L'$ to the input ankle. Arm $181A_L'$ of that rotary is connected to one end of the seesaw link $177_L'$ via link $181B_L'$.

In analogous fashion, output rotary $183_L'$ (FIG. 35) connects the ankle control unit $173_L'$ to the output ankle to take feedback therefrom. The arm $183A_L'$ of that rotary is connected to the other end of the seesaw link $177_L'$ via link $183B_L'$. The output rotary $183_L'$ is a feedback rotary from the output ankle. It responds, replicates and transmits the output ankle rotation to the seesaw link $177_L'$.

The bodies of the rotaries $181_L'$, $183_L'$ are fixed on a common shaft fixed with respect to the tibia portion $43A_L'$ whilst the arms $181A_L'$, $183A_L'$ are mounted to pivot independently about that shaft in direct relation to the corresponding cable movements.

Figure 19:
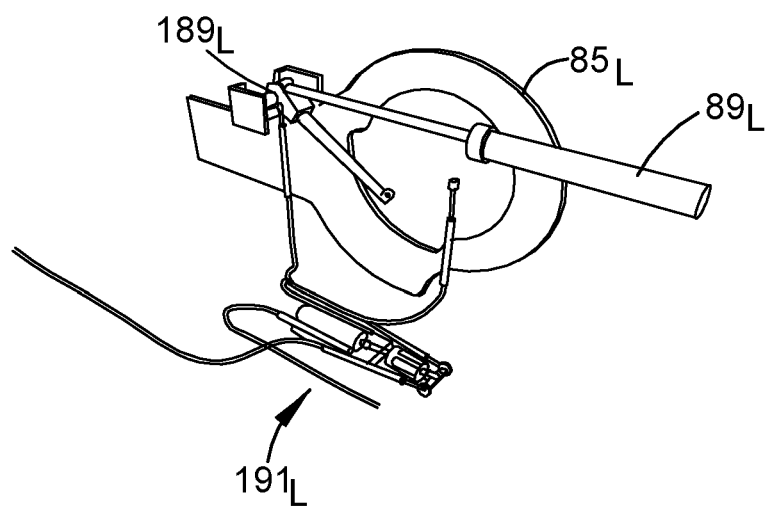
Figure 20:
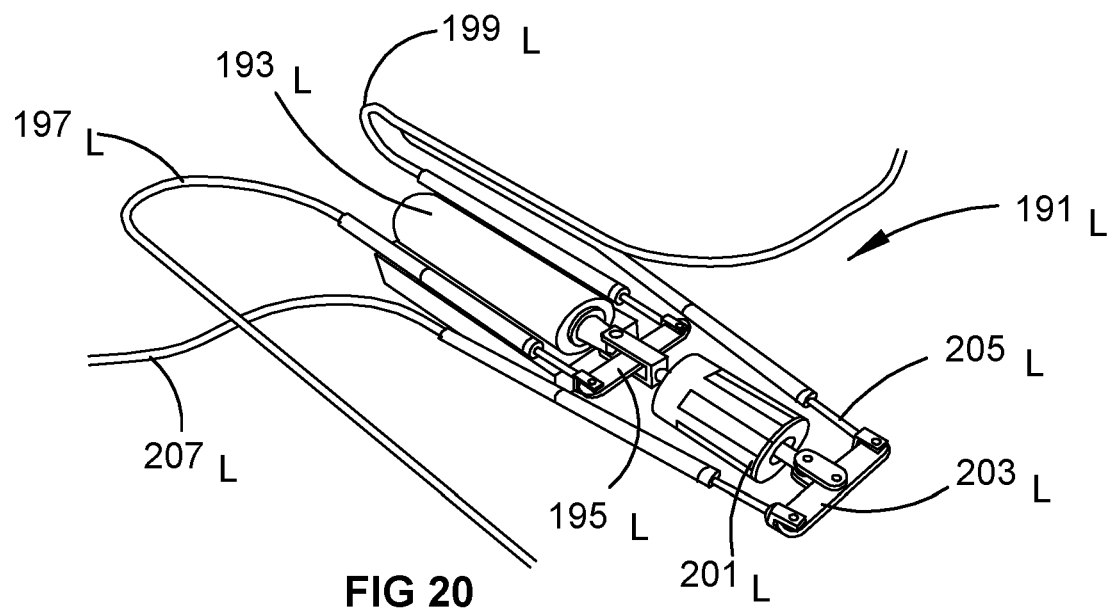

FIG. 19 illustrates the actuator $89_L$ trunnion-mounted to the femur head $85_L$ and a flex mount $189_L$ by which the actuator $89_L$ is connected to the pelvis unit $81_L$ (not shown in FIG. 19). A hip control unit $191_L$ is of analogous construction to the ankle control unit $173_L$ (FIG. 20). It comprises a valve $193_L$, a see-saw link $195_L$, a push-pull cable $197_L$, a push-pull cable $199_L$, and a spring unit $201_L$.

The push-pull cable $197_L$ applies a translational signal from the rotary $119_L$ of the input hip to the see-saw link. The push-pull cable $199_L$ is connected between the pelvis unit $81_L$ and the femur head $85_L$ and serves to apply a translational signal indicative of an angle of the femur $39_L$ with respect to the pelvis unit $81_L$ and to apply that signal to the valve $193_L$ via the see-saw link $195_L$.

The spring unit $201_L$ sits between the input shaft of the valve $193_L$ and a see-saw link $203_L$. On one side of the spring unit, a force-feedback push-pull cable is connected to the see-saw link $203_L$. On the other side of the spring unit $201_L$, a walk-assist push-pull cable $207_L$ is connected to the see-saw link $203_L$.

The other end of the walk-assist push-pull cable $207_L$ is connected to the multiplier link $167_L$ (FIG. 17) via amplitude link $209_L$.

When the vehicle 1 is walking, the left leg $5_L$ takes weight during its stance phase, and in turn the left multiplier link $167_L$ deflects (anti-clockwise as drawn in FIG. 17) as load is taken by the left leg before returning to its "leg unladen" position as the load is released from the left leg.

One end of the amplitude link $209_L$ is connected to the push-pull cable $207_L$ whilst the other end is connected at the end of another crank of the multiplier link $167_L$. This other crank is the same length as the amplitude link $209_L$. An adjuster $211_L$ is arranged to adjust an angle of the amplitude link with respect to the crank of the multiplier link, whereby a radius of the end of the push-pull cable $207_L$ with respect to the pivot axis of the multiplier link $167_L$ is adjustable upwards from 0 mm. Other radial adjustment mechanisms are possible.

Components $207_L$, $209_L$, $211_L$ constitute a walk-assist mechanism that provides a mode of the vehicle 1 user-selectable to reduce the operator effort necessary for walking.

For some tasks, the end of the cable $207_L$ can be positioned coincident with the pivot axis of the multiplier link $167_L$ whereby the push-pull cable $207_L$ is essentially fixed in position, and in turn the hip control unit $191_L$ operates in a manner closely analogous to the ankle control unit $173_L$.

To adopt walk-assist mode, via a suitable user interface within the cabin, the operator triggers the adjuster $211_L$ to move the point of connection (between components $207_L$, $209_L$) to a radius from the pivot axis of the multiplier link $167_L$, whereby the push-pull cable $207_L$ is periodically pushed back and forth in response to the periodic motion of the multiplier link $167_L$ as the vehicle is walking. This period movement is applied to the see-saw link $203_L$. Walk-assist serves to bias the actuator $89_L$ towards rearwardly driving the leg $5_L$ (so as to forwardly propel the vehicle 1) in positive relation to the weight borne by the leg $5_L$.

Figure 17:
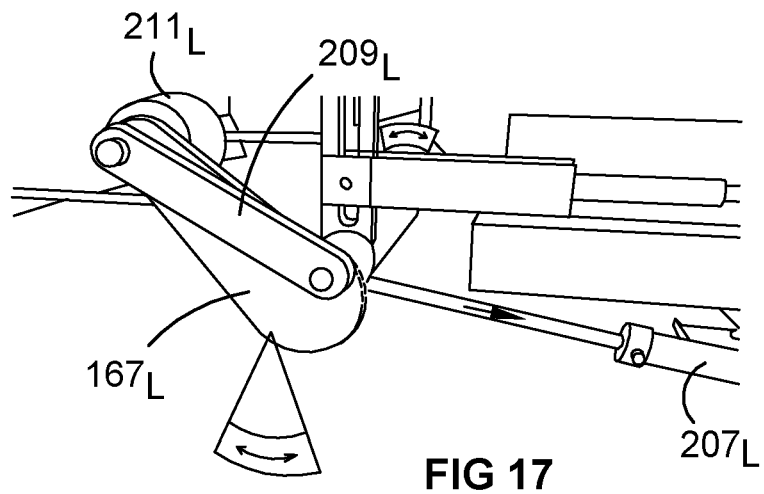

Without walk-assist, when the vehicle is standing stationary with a neutral stance, the fore-aft feedback on the operator's left leg (delivered via the rotary $119_L$ in this case) is also neutral. The radial adjustment mechanism illustrated in FIG. 17 is configured so that, when walk-assist is engaged, not only is the cable 207 periodically driven, but a mid-point of that periodic motion is displaced from a non-walk-assist position of the cable. This shift tends to urge the hip actuator $89_L$ towards forward movement. The net effect of these two changes is that the rearward urging of the leg $5_L$ is positively related to an amount of weight borne by the leg $5_L$ and a neutral point at which no fore-aft feedback is delivered to the operator via the rotary $119_L$ is shifted so as to occur when the leg $5_L$ is bearing a proportion of a weight of the vehicle 1.

In this way, when walk-assist is activated and the leg $5_L$ is bearing the entire weight of the vehicle, the leg $5_L$ is rearwardly urged without, or more than, corresponding rearward urging from the operator (i.e. the leg $5_L$ is rearwardly biased). Towards the end of the stance phase of the leg $5_L$, as load is being relieved from that leg, the amount of weight passes a predetermined proportion of the vehicle's weight corresponding to neutral feedback, and walk-assist then urges the right leg to move forward without, or more than, corresponding forward urging from the operator (i.e. the leg $5_L$ is forwardly biased, or to put it another way, negatively rearwardly biased). Walk-assist may be usefully employed in the context of vehicles with no analog of the cable 129.

Figure 21:
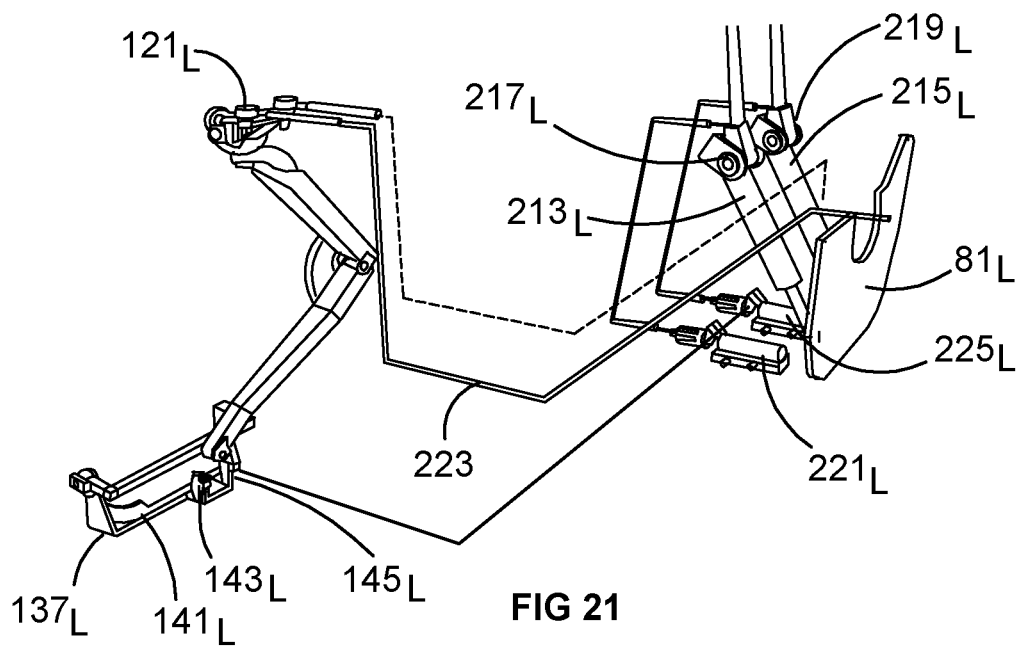

Turning to FIGS. 9 and 21, actuators $213_L$, $215_L$ are mutually spaced in the fore-aft direction, in this case respectively fore and aft of the cross member 67, and act between the chassis 11 and the pelvis unit $81_L$ to control the leg $5_L$ in abduction/adduction and toe-in/toe-out. Each of the actuators comprises a respective flex mount $217_L$, $219_L$. In this case, the actuators are inverted and the flex mounts sit atop the tail ends of the actuator bodies, whilst the actuator rods project downwardly to the lower reaches of the pelvis unit $81_L$.

A lateral control unit $221_L$ takes translational feedback from the rotary $143_L$ (FIG. 11) and force-feedback from the flex mount 217, and drives the actuator $213_L$. Instead of positional feedback being routed to the control unit 221, a push-pull cable 223 connects the pelvis unit $81_L$ to a corresponding attachment point $121_L$ of the input hip. Thus, the rotary $143_L$, lateral control unit $221_L$, actuator $213_L$, flex mount $217_L$ and the forwardmost attachment point $121_L$ comprise a feedback loop via which the position of a front lower portion of the pelvis unit $81_L$ is controlled. The rotary $145_L$, lateral control unit $225_L$, actuator $215_L$, flex mount $219_L$ and the rearward point of attachment $121_L$ together form a feedback loop for controlling a lateral position of a rearward lower portion of the pelvis unit $81_L$.

Outwardly pushing on the foot plate $141_L$ to cause it to move with respect to the cradle $137_L$ triggers the rotaries $143_L$, $145_L$, which in turn triggers the actuators $213_L$, $215_L$ to move in unison to outwardly drive the lower reaches of the pelvis unit $81_L$, whereby the leg $5_L$ outwardly pivots about the T piece $71_L$ (abduction), and in turn, via the attachment points $121_L$, the input leg $49_L$ is driven to move outwardly until the neutral position of the foot plate $141_L$ with respect to the cradle $137_L$ is resumed. The foot plate $141_L$ is mounted to twist with respect to the cradle $137_L$ to differentially drive the actuators $213_L$, $215_L$ to effect toe-in and toe-out movement (i.e. to pivot the leg $5_L$ about the upright axis of the T piece $71_L$).

Figure 22:
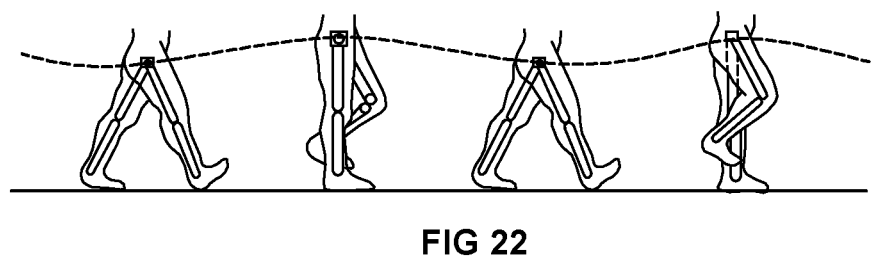
FIG. 22 illustrates a human gait cycle.
Figure 23:
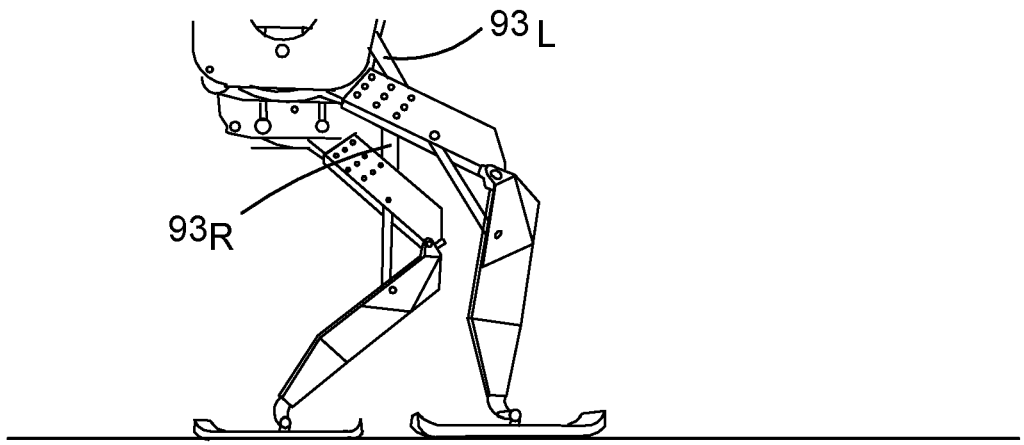

FIG. 22 illustrates a typical human gait in which the hips bob up and down with local maxima at mid-stance. The present inventor has recognised that if the output hips $61_L$, $6_R$ were to bob up and down in a corresponding manner, this would be most uncomfortable for the operator, would consume power, and would stress and fatigue components of the vehicle. Preferred variants of the vehicle define a transfer function between the input and the output legs, such that the output legs do not simply mimic the movement of the input legs but, rather, serve to provide a smoother ride whilst the operator moves the foot holds $59_L$, $59_R$ in a manner approximating the relative movement of the feet with respect to the hips during a typical human gait. This enables the operator to comfortably walk on the foot holds on the one hand, and on the other hand enables smoother forward conveyance. A preferred approach to this variation is to extend the output legs by an amount disproportional to the extension of the input legs and positively related (e.g. proportionate) to a magnitude of a departure of the output hips from their mid-stance position (e.g. a departure of the femur $39_L$ with respect to the pelvis unit $81_L$).

A preferred implementation of the concept comprises ride-smoothing units $227_L$, $227_R$ (FIGS. 4 and 24 to 26) intercepting the cables $129_L$, $129_R$ behind the operator.

Figure 24:
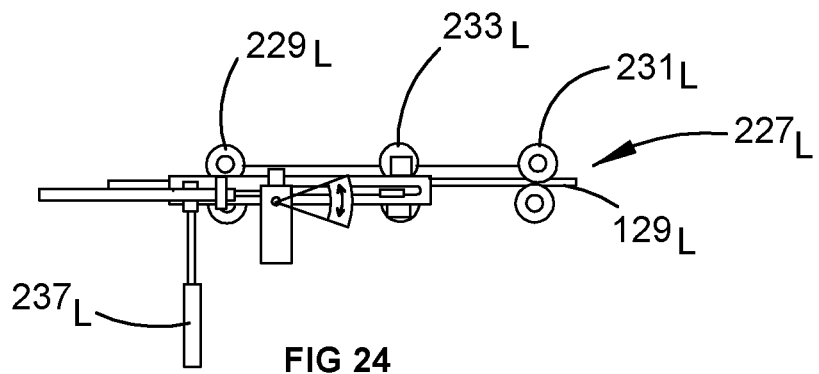
Figure 25:
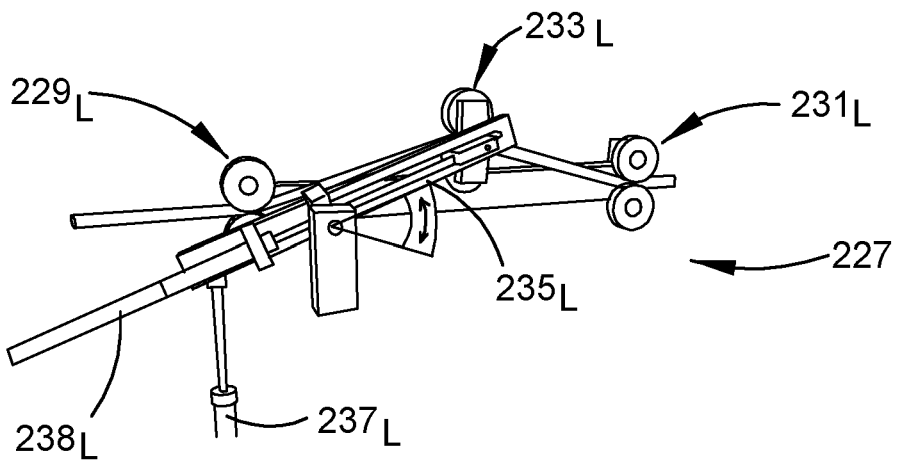
Figure 26:
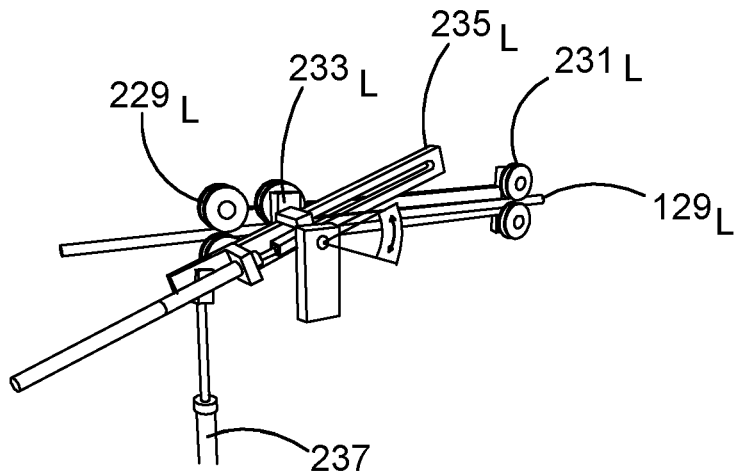

The unit $227_L$ comprises two pairs $229_L$, $231_L$ of rollers fixed with respect to each other and a further movable pair $233_L$ of rollers. When the leg $5_L$ is at mid-stance, the roller pairs $229_L$, $231_L$, $233_L$ sit in register to guide the cable $129_L$ along a straight course (FIG. 24). When the ride-smoothing mechanism $227_L$ is in its operative configuration (FIGS. 24 and 25), the movable roller pair $233_L$ rises and falls with respect to the fixed roller pairs $229_L$, $231_L$ to extend the cable path, thereby shortening the length of the cable relative to the cable path. This has similar effect to pressing down on the foot hold $59_L$ whereby the actuator $93_L$ is driven to open the knee $41_L$ as that knee departs from the mid-stance position.

Preferably, the movable rollers are carried by a rocker $235_L$ driven to rotate by push-pull cable $237_L$ connected (in a manner akin to the push-pull cable $199_L$) between the femur $39_L$ and the pelvis unit $81_L$ to take a translational feedback signal related to the angular orientation of the femur with respect to the pelvis unit.

Preferably, the one or more of the movable pair $233_L$ and the point of attachment of the cable $237_L$ to the rocker $235_L$ is movable with respect to a pivot axis of the rocker to enable the extent of ride-smoothing to be adjusted. In this example, an adjuster $238_L$ is connected to a suitable user interface within the cabin to enable the operator to slide the movable pair $233_L$ along the rocker $235_L$ from the 100% position illustrated in FIG. 25 to the 0% ride-smoothing illustrated in FIG. 26. In the 0% position, the movable pair of rollers 233 (or more precisely, the cable-guiding gap therebetween) is moved into register with the pivot axis of the rocker 235 whereby the cable $129_L$ remains undeflected from its straight path (from the roller pair 231 to the roller pair 233) as the rocker oscillates back and forth.

In the described example of the vehicle 1, without ride-smoothing a user input akin to a typical human gait results in the output hips bobbing by about 155 mm (peak to trough). Preferred variants of the ride-smoothing mechanism enable operators to adjust the adjuster 238 to substantially eliminate this bobbing.

The legs $5_L$, $5_R$ are preferably more than twice as long as a typical human's legs.

Preferably, when the output leg $5_L$ is at mid-stance (when the knee $41_L$ is at 90° in this case), the axis of the hips (i.e. the key point at the juncture of the T pieces 71) is more than 2 m above the ground, preferably more than 2 m above the ankles $45_L$, $45_R$. In this case, the positions of the ankles $45_L$, $45_R$ are characterised by the position of their generally transverse pivot axes. Preferably, the ankle to hip measurement is in the range of 2,400 mm±500 mm, or more preferably 2,400 mm±150 mm.

A width of the output hips is characterised by the separation of the horizontal axes of the T pieces $71_L$, $71_R$. Preferably, a ratio of (a) an output hip-to-ankle length to (b) the output hip width is within 20%, more preferably within 10%, of a corresponding ratio for the input legs. The corresponding ratio for the input legs is the hip-to-ankle measurement (about 830 mm in this case) to an adjusted input hip width. The adjusted input hip width is the spacing of the input hips (about 600 mm in this case) less the inboard offsets of the foot holds $59_L$, $59_R$ (i.e. less about 2×150 mm in this case).

In this example, the output hip width is about 870 mm. In another variant having an output hip-to-ankle measurement of about 3 m, a hip width in the vicinity of 1,080 mm would be desirable.

Applying these geometric relationships:
A. when an operator stands so that their feet (corresponding to the foot holds) directly underlie their hips, the output feet directly underlie the output hips; and
B. when one of the extended input legs is abducted to move one of the foot holds into the operator's sagittal plane, the corresponding output foot is moved into the sagittal plane of the vehicle 1.

These two correspondences contribute to the intuitive feel of the vehicle, and it is preferred that even variants of the vehicle 1 that do not comprise input legs are configured to provide A or B, or more preferably A and B, e.g. are configured so that when the foot of an extended operator's leg is moved into the operator's sagittal plane, the corresponding foot of the vehicle is moved substantially into the sagittal plane of the vehicle.

Preferred variants of the vehicle 1 are configured so that input movements relative to the operator's centre of mass produce output movements, relative to a centre of mass of the vehicle, that are about proportional. This also contributes to intuitive operation of the vehicle. The constraint 19 configured to enable an operator's body to pivot about at least one axis about coincident with the operator's centre of mass also helps in this regard. In a more elaborate implementation, the operator might be restrained to spherically pivot about their centre of mass whilst that centre point is fixed with respect to the chassis 11 (or more relevantly, with respect to the vehicle's centre of mass).

Figure 27:
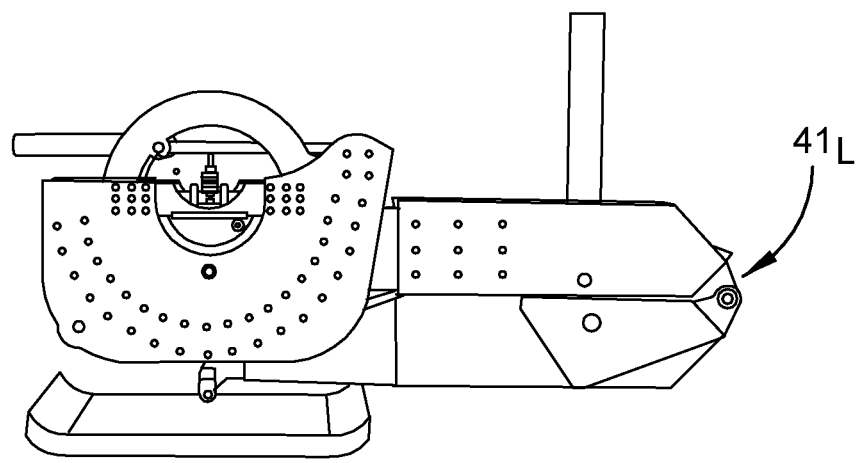
Figure 28:
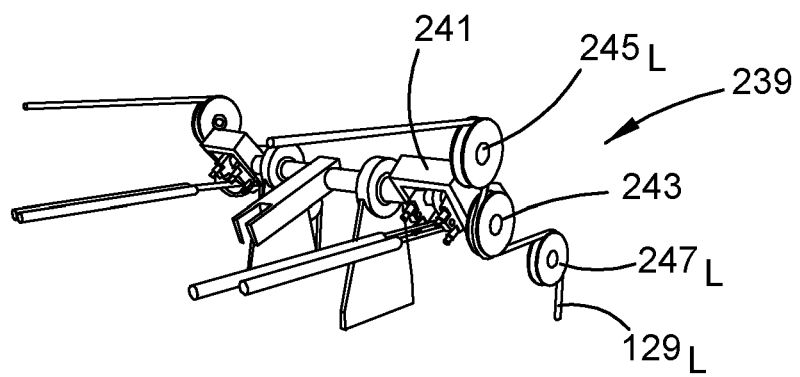

Preferred variants of the vehicle have long legs enabling them to traverse significant distances and step on and over obstacles that would impede the movement of other land vehicles. This however presents the challenge that, when the vehicle is standing, the cabin is high in the air. Whilst the operator might squat so as to draw the foot holds $59_L$, $59_R$ as high as possible, and thereby lower the cabin, it would then be awkward for the operator to exit the vehicle from this position. Accordingly, preferred variants of the vehicle 1 comprise a vehicle-lowering mode user-selectable to lower the vehicle whilst the input legs $49_L$, $49_R$ remain extended. Most preferably, the vehicle-lowering mode lowers the knees $41_L$, $41_R$ to 0° (see FIG. 27) and the vehicle is configured to stably retain this position. A body of the vehicle may be equipped with landing gear (or other stabilising ground-contacting portions) that is arranged to contact the ground when the body is lowered in this way and/or a centre of mass of the vehicle 1 may be positioned so as to remain within the footprint of the feet 47 without user input.

Preferred variants of the vehicle 1 lower to the ground and rest stably to enable the operator to climb in and out without the need for elevated docking facilities (e.g. without the need for elevated docking facilities akin to those required by large passenger jets). Variants of the vehicle 1 may be equipped with boarding ladders (e.g. akin to the ladders carried by large mining trucks) although preferred variants do not require ladders.

Preferably the vehicle is equipped to rest stably in its lowered position whilst one, or preferably both, of the plurality of ankle actuators and the plurality of knee actuators are relaxed. Most preferably, this is achieved whilst substantially all of the weight of the vehicle is borne by the feet of the vehicle.

In a preferred implementation the knees are configured to fully close (e.g. wherein the included angle at the front of each knee is reduced to zero) and a permanent or selectively engageable stop limits the ankle movement so that as the vehicle is lowered to the ground it cants forward with respect to its upright walking position. In this way the mass of the high mounted components move forward to offset the rearward movement of the mass of the legs. This arrangement allows the vehicle to advantageously be stored on stable level ground without any power supply to maintain pressure in the actuators. It also enables the actuators to be conveniently serviced.

A vehicle-lowering system 239 intercepts the cables $129_L$, $129_R$ behind the ride-smoothing units $227_L$, $227_R$ (see FIGS. 4 and 28 to 30).

The vehicle-lowering unit 239 comprises a single member 241 mounted to pivot so as to simultaneously manipulate the respective control sub-systems for the left and right output legs $5_L$, $5_R$. The member 241 is preferably a compound member comprising separate integral bodies fastened to each other. Alternatively, it may itself be a single integral body of material, e.g. it may be machined from billet. "Integral" and similar terminology is used herein in its conventional sense to refer to a single contiguous body of material. As such, two bodies may be integrated by welding, but not by conventional mechanical fastening.

Figure 29:
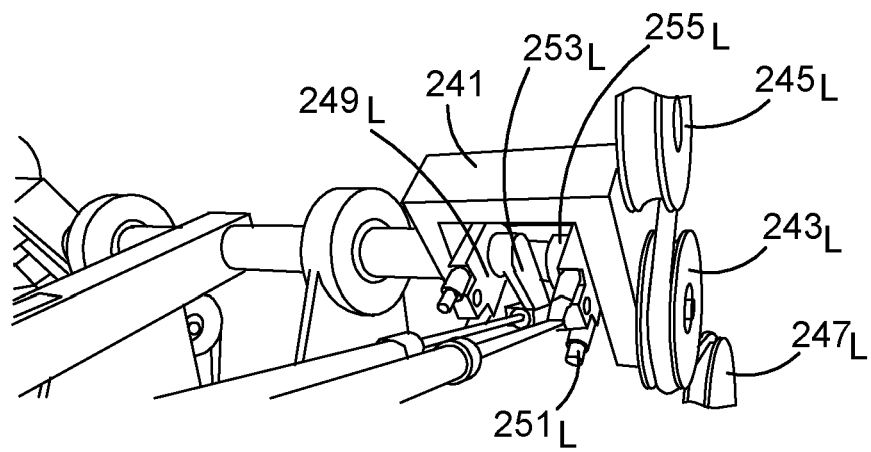

Each end of the member 241 is essentially the same as the other. The left-hand end of the member 241 carries a movable roller $243_L$ carried by the member 241 at a radius to a lateral axis about which the member 241 pivots. The movable roller $243_L$ sits between a pair of fixed rollers $245_L$, $247_L$ and the cable $129_L$ follows a serpentine path about these three rollers. As best shown in FIG. 29, rotaries $249_L$, $251_L$ each are fixed to the member 241 and each carry a respective crank $253_L$, $255_L$.

Figure 12:
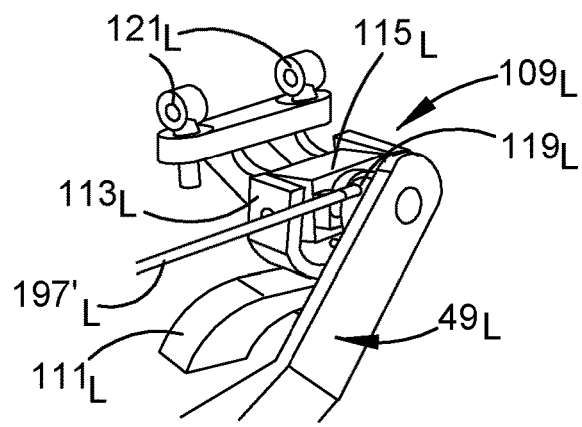
Figure 13:
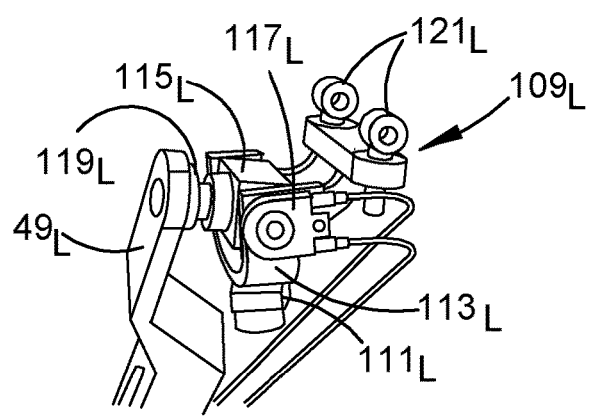
Figure 30:
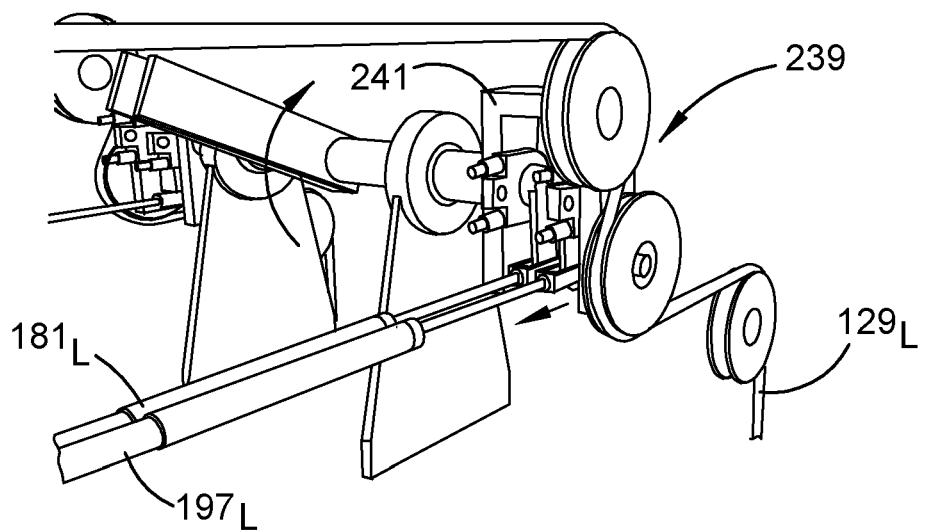

Rotary $249_L$ is connected to the input ankle $57_L$ via a push-pull cable (not shown). The rotary $249_L$ takes the translational control signal from the rotary of the ankle $57_L$ and drives the cable $181_L$ via the crank $253_L$ with respect to the body of the rotary $249_L$. Components $251_L$, $255_L$ likewise connect the hip-position push-pull cable $197_L$ to the rotary $119_L$ via push-pull cable $197'_L$ (FIG. 12). FIG. 30 illustrates the vehicle-lowering system 239 in its operative configuration. To lower the vehicle, whilst the input legs $49_L$, $49_R$ remain extended, the member 241 is pivoted to simultaneously turn cranks $253_L$, $255_L$ and move roller $243_L$ (with respect to rollers $245_L$, $247_L$ so as to shorten the cable path). In this way, the vehicle-lowering system 239 coordinates the operation of the hips, knees and ankles to lower the vehicle.

In variants of the vehicle 1 comprising only an electrical connection between the input system and the output system, the vehicle-lowering member 241 might be replaced by a software element.

This example of the vehicle 1 comprises an interlock between the vehicle-lowering and ride-smoothing systems. Preferably, a user interface by which a user triggers rotation of the vehicle-lowering member 241 is also connected to the adjuster $238_L$ (and the corresponding adjuster of the right leg) to deactivate the ride-smoothing system before lowering the vehicle.

The combination of a forward-mounted cabin and rearwardly-bending knees is preferred in that it enables the cabin to be brought lower to the ground when the vehicle squats. The low-mounted cabin also keeps the operator closer to a centre of mass of the machine which improves the feel of the machine. It helps the operator to feel as if they are a part of the machine rather than sitting atop it. Ideally, operating the vehicle quickly becomes instinctive, thereby reducing operator fatigue and freeing cognitive capacity for other tasks.

Many variants of the concepts disclosed herein are possible. By way of example, whilst mechanical transmissions in the form of push-pull cables are described for a variety of purposes, various of those cables might be replaced by cables acting only in tension (e.g. acting in tension against a suitable spring). Hydraulic circuits are another example of mechanical transmissions. By way of example, some of the push-pull cables described herein might be replaced by hydraulic lines akin to automotive brake lines. In some places, this might further improve the fidelity of the feedback. Whilst hydraulic servo systems have been described, other control systems are possible.

Figure 15:
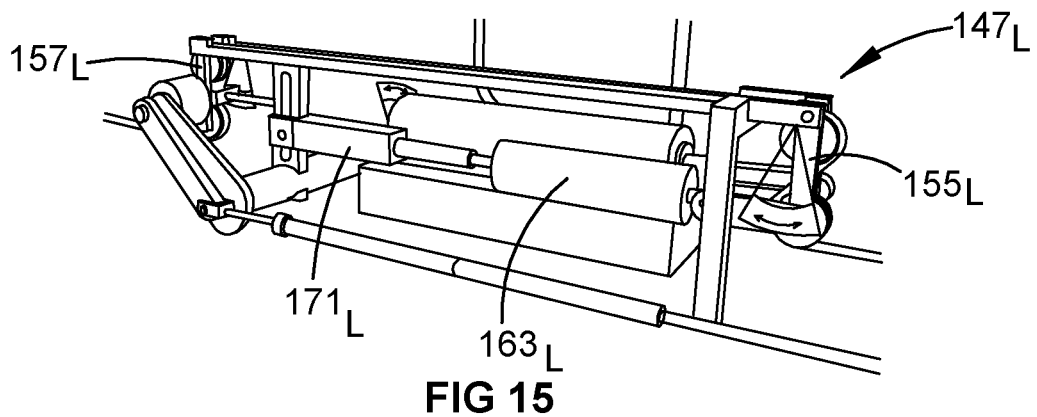
Figure 16:
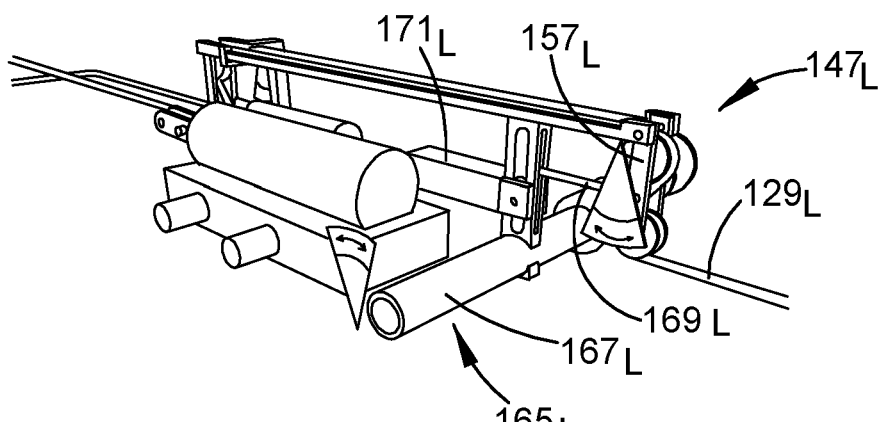
Figure 31:
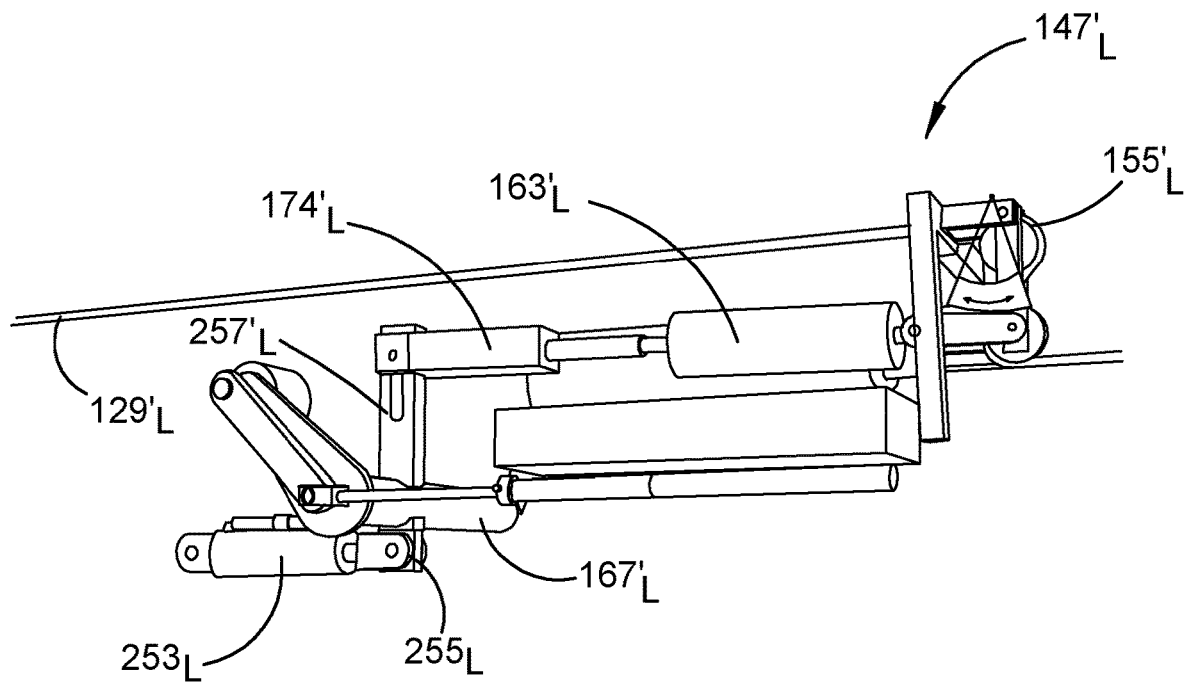
FIG. 31 is a front-right perspective view of an alternative knee control unit.
Figure 32:
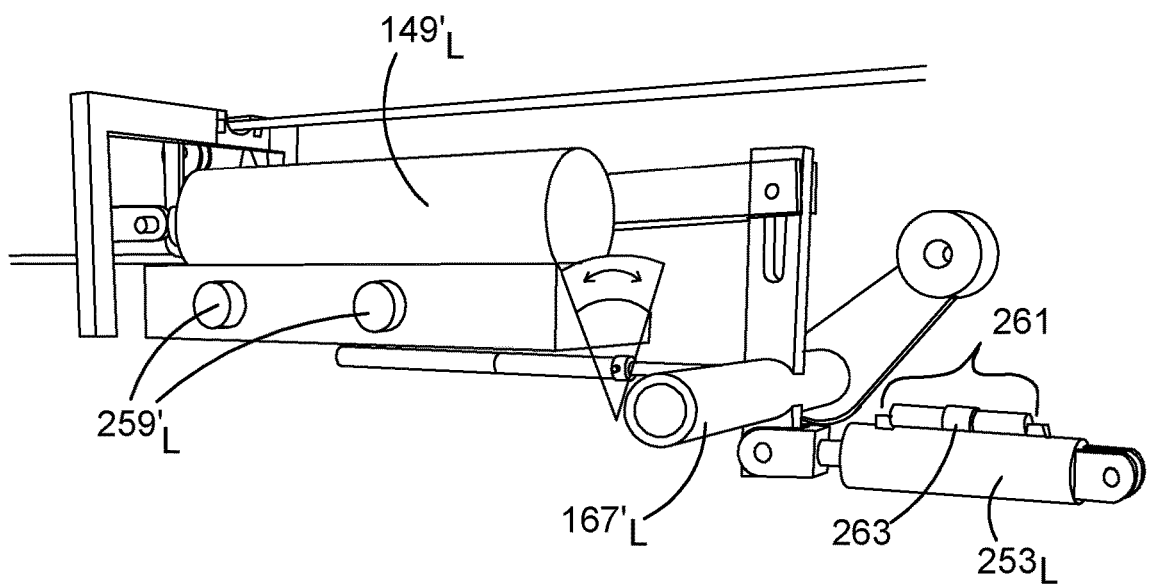
FIG. 32 is a rear-left perspective view of the alternative knee control unit.

FIGS. 31 and 32 illustrate an alternative knee control unit $147_L'$ and correspond to FIGS. 15 and 16. The knee control unit $147_L'$ does without the flex mount $95_L$ and instead relies upon a hydraulic force-feedback system. Without the flex mount $95_L$, there is no need to compensate for the uncommanded knee closure associated with flexing within the flex mount, and in turn there is no need for the null link $157_L$.

Instead of the flex mount and cable based force-feedback system, the knee control unit $147_L'$ incorporates a fluid actuator $253_L$. In this case, the actuator is mounted to a short crank portion $255_L$ opposite the crank portion $257_L$ to which the trim adjuster $171_L$ is attached.

The valve $149_L'$ comprises outlet ports $259_L$ that are connected towards corresponding ports towards each end of the body of the actuator on the output knee. The ports $259_L$ are also directly connected to a corresponding pair of ports 261 along the body of the actuator $253_L$. In this way, the actuator $253_L$ is plumbed in parallel to the actuator on the output knee. As such, the pressure differential across the two ports 261 substantially corresponds to the pressure differential across the two ports of the actuator on the output knee, which also substantially corresponds to the pressure differential across the ports $259_L$.

A bleed-down orifice 263 mutually connects the ports 261 to cause the valve $149_L'$ to deliver a small volume of fluid to maintain constant force-feedback. This small flow rate entails a negligible loss of efficiency but aims to provide improved force-feedback by ameliorating lags and transients (e.g. shuddering) that might occur if the pressure between the output actuator and feedback actuator pressures were simply allowed to equalise "under their own steam", particularly in the context of a change in the load on the output leg without commanded movement of the output actuator, e.g. in the context of ground-subsidence and/or movement of the other output leg.

In this example, the actuator $253_L$ and the corresponding actuator on the output knee are configured to simultaneously expand in response to the same pressure signal. It would also be possible for one of the actuators to be driven to expand whilst the other actuator is driven to retract, whilst the two actuators are plumbed in parallel to each other as the wording "parallel" is used herein. Likewise, in some potentially practical plumbing configurations, the output actuator and the feedback actuator might be mutually connected when the valve is driving the output actuator in one way or the other, but not when the valve is in its neutral position. Such arrangements are "parallel" as that word is used herein.

In this way, as the actuator on the output knee is urged to open the knee, the actuator 253 urges the multiplier link $167_L'$ to rotate so as to shift the anchor point against which the spring $163_L'$ acts, and thereby urges the input link $155_L$ towards extending the cable path (that is, shortening the relative length of the cable $129_L'$), thereby providing force-feedback to the user.

Typically, the actuator $253_L$ will have a much smaller effective area (e.g. piston diameter) than the actuator on the output knee whereby, whilst exposed to the same fluid pressure differential, a smaller force is applied to the multiplier link $167_L'$. The effective length of the crank $255_L$ relative to the effective length of the crank $257_L$ also influences a magnitude of the force-feedback. A hydraulic intensifier mutually connecting the feedback and output actuator is another possibility. Typically, it is convenient for the effective length of the crank $255_L$ to be relatively shorter. One or both of the effective lengths might be adjustable. In this case, the effective length of the crank $257_L$ is adjustable and, at a midpoint of a range of that adjustment, the effective length of the crank $257_L$ is about three times the effective length of the crank $255_L$.

Many variations on the concept are possible. By way of example, the actuator $253_L$ and the spring $163_L'$ essentially work in parallel whereby these two components might be swapped. Indeed, in a simple knee control system without the walk-assist function, the multiplier link $167_L'$ and the spring $163_L'$ might be eliminated and the actuator $253_L$ might simply act directly on the input link $155_L'$.

Fundamentally, the illustrated force-feedback system comprises a hydraulic force-feedback actuator hydraulically connected to the output actuator to provide force-feedback corresponding (e.g. proportional) to the force applied by the output actuator. Other plumbing arrangements are possible. In one advantageous variant, the bleed-down orifice 263 is eliminated and both ends of the feedback actuator $253_L$ are fluidly connected to the high-pressure end of the output actuator $93_L$. In this variant, whilst the output leg is weight-bearing, the lower-pressure end of the actuator $93_L$ is held at a constant pressure, which in this example corresponds to a reservoir pressure of the hydraulic system. As such, the pressure on the high-pressure side of the actuator $93_L$ linearly varies with respect to the load applied by that actuator. By exposing both ends of the actuator $253_L$ to this pressure, the actuator $253_L$ exerts a force corresponding to the product of the pressure on the high-pressure side of the actuator $93_L$ and a cross-sectional area of a rod of the actuator $253_L$. In this way, a relatively robust and inexpensive actuator can be used as the force-feedback actuator and to scale down the force-feedback. This in turn enables the crank portion $255_L$ to be extended (or the knee control unit $147_L'$ to be otherwise reconfigured) to improve the fidelity of the force-feedback.

A drawback of this variant is a loss of the force-feedback that occurs when a lower end of the actuator $93_L$ is pressurised (and the top end is dropped to reservoir pressure) to lift the output leg. This means that the operator cannot feel just how hard the leg is being pulled up. The inventor regards this as a compromise worth making for improved feedback whilst the output leg is load-bearing.

Similar hydraulic force-feedback may be employed in connection with the other joints. By way of example, in connection with the ankle control system of FIG. 18, the flex mount $107_L$ and cable $187_L$ might be eliminated by replacing the spring $185_L$ with an actuator akin to the actuator $253_L$ and plumbed in parallel to the actuator 105.

While the above description refers to one embodiment of the vehicle, it will be appreciated that other embodiments can be adopted by way of different combinations of features. Such embodiments fall within the spirit and scope of this invention.

Furthermore, various elements of the technology disclosed herein may well be employed in other contexts. By way of example, various details of the control system 7 may be employed in the context of walking vehicles other than bipedal vehicles (e.g. in the context of a quadruped). Indeed, various aspects of the control system may be employed in entirely different contexts. The flex mounts may be conveniently employed in other contexts, perhaps unrelated to vehicles, where force-feedback is desirable.

The term "comprises" and its grammatical variants has a meaning that is determined by the context in which it appears. Accordingly, the term should not be interpreted exhaustively unless the context dictates so.

The invention claimed is:

1. A bipedal vehicle comprising:
   two extendible output legs that support the bipedal vehicle;
   two foot holds that accept input movement from an operator; and
   a control system comprising powered actuators that move the two extendible output legs in relation to the input movement and thereby produce output movement; and
   a mode user-selectable to lower the bipedal vehicle while legs of the operator remain extended.

2. A bipedal vehicle comprising:
   two extendible output legs that support the bipedal vehicle;
   two foot holds that accept input movement from an operator;
   a control system comprising powered actuators that move the two extendible output legs in relation to the input movement and thereby produce output movement;
   wherein the control system comprises a respective knee sub-system for each respective output leg of the two extendible output legs;
   each respective knee sub-system comprises a respective position-feedback Flexible Pulling System (FPS) tensioned by a respective knee input movement and relaxed by a respective knee output movement corresponding to the respective knee input movement; and
   a respective position-feedback FPS relative-length being a respective position-feedback FPS length relative to a respective position-feedback FPS path length.

3. The bipedal vehicle of claim 2 wherein each respective knee sub-system comprises a respective knee actuator effecting the respective knee output movement and controlled in response to a respective tension in the respective position-feedback FPS.

4. The bipedal vehicle of claim 3 wherein each respective knee sub-system comprises a respective actuator-drive comprising a respective bias and a respective drive input that moves against the respective bias by the respective tension and thereby varies a respective drive to the respective knee actuator.

5. The bipedal vehicle of claim 4 wherein each respective knee sub-system comprises a respective preload adjustor by which a respective preload on the respective bias is adjusted and the bipedal vehicle comprises a preload user-interface by which the operator, whilst operatively engaged with the two foot holds, provides a single user-input and thereby simultaneously adjusts each respective preload adjustor.

6. The bipedal vehicle of claim 2 wherein each respective output leg swings fore and aft about a respective output hip and each respective output leg has a respective ride-smoothing mechanical transmission by which the respective position-feedback FPS relative-length is varied in relation to a respective magnitude-of-departure of the respective output hip from a respective mid-stance position.

7. A bipedal vehicle comprising:
   two extendible output legs that support the bipedal vehicle;
   two foot holds that accept input movement from an operator; and
   a control system comprising powered actuators that move the two extendible output legs in relation to the input movement and thereby produce output movement;
   wherein each respective output leg swings fore and aft about a respective output hip; and the control system extends each respective output leg by an amount, more than proportionate to a respective input extension, positively related to a respective magnitude-of-departure of the respective output hip from a respective mid-stance position to smooth a ride of the bipedal vehicle.

8. The bipedal vehicle of claim 7 having a mode user-selectable to lower the bipedal vehicle whilst legs of the operator remain extended.

9. The bipedal vehicle of claim 1 wherein each respective output leg comprises a respective knee.

10. The bipedal vehicle of claim 9 wherein each respective knee is rearwardly directed.

11. The bipedal vehicle of claim 1 wherein each respective output leg comprises a respective ankle driven by a respective one of the powered actuators in relation to the input movement.

12. The bipedal vehicle of claim 1 wherein each respective output leg is movable in abduction and adduction.

13. A bipedal vehicle comprising:
   two extendible output legs that support the bipedal vehicle;
   two foot holds that accept input movement from an operator; and
   a control system comprising powered actuators that move the two extendible output legs in relation to the input movement and thereby produce output movement;
   wherein each respective output leg is movable toe-in and toe-out.

14. The bipedal vehicle of claim 1 wherein the control system provides force-feedback to the operator via the two foot holds.

15. The bipedal vehicle of claim 1 wherein the control system produces an output gait at least 20% longer than an input gait.

16. The bipedal vehicle of claim 1 comprising a cabin to house the operator.

17. The bipedal vehicle of claim 1 comprising a restraint for restraining at least a portion of torso of the operator.

18. The bipedal vehicle of claim 17 wherein the restraint is arranged with respect to the two foot holds and thereby enables the operator to stand on the two foot holds with a neutral posture.

19. The bipedal vehicle of claim 18 wherein the bipedal vehicle stands with a neutral stance in response to the operator standing with a neutral stance.

* * * * *